United States Patent
Palmnäs

(10) Patent No.: US 10,499,752 B2
(45) Date of Patent: Dec. 10, 2019

(54) REFRIGERATED FOOD BAR ARRANGEMENT AND A COOLING SYSTEM FOR SUCH A FOOD BAR

(71) Applicant: Picadeli AB, Göteborg (SE)

(72) Inventor: Markus Palmnäs, Alingsås (SE)

(73) Assignee: PICADELI AB, Gothenburg (SE)

( * ) Notice: Subject to any disclaimer, the term of this patent is extended or adjusted under 35 U.S.C. 154(b) by 25 days.

(21) Appl. No.: 15/314,314

(22) PCT Filed: May 12, 2015

(86) PCT No.: PCT/SE2015/050536
§ 371 (c)(1),
(2) Date: Nov. 28, 2016

(87) PCT Pub. No.: WO2015/183157
PCT Pub. Date: Dec. 3, 2015

(65) Prior Publication Data
US 2017/0188720 A1 Jul. 6, 2017

(30) Foreign Application Priority Data

May 29, 2014 (SE) ...................................... 1450649
Jun. 2, 2014 (SE) ...................................... 1450665
Jul. 10, 2014 (SE) ...................................... 1450884

(51) Int. Cl.
A47F 3/04 (2006.01)
A47F 10/06 (2006.01)
(Continued)

(52) U.S. Cl.
CPC ................ *A47F 3/04* (2013.01); *A47B 31/02* (2013.01); *A47F 3/0443* (2013.01); *A47F 10/06* (2013.01);
(Continued)

(58) Field of Classification Search
CPC ........ F25D 11/02; F25D 17/04; F25D 17/045; F25D 17/06; F25D 17/065; F25D 17/08;
(Continued)

(56) References Cited

U.S. PATENT DOCUMENTS 5,168,719 A 12/1992 Branz et al.
5,363,672 A 11/1994 Moore et al.
(Continued)

FOREIGN PATENT DOCUMENTS

| EP | 1059052 A2 | 12/2000 |
|---|---|---|
| GB | 2156059 A | 10/1985 |
| WO | 2014/148968 A1 | 9/2014 |

OTHER PUBLICATIONS

European Patent Office, Supp. Euro. Search Report in EP15799208, dated Dec. 15, 2017.
(Continued)

*Primary Examiner* — Joseph F Trpisovsky
(74) *Attorney, Agent, or Firm* — Jeffrey S. Melcher; Melcher Patent Law PLLC

(57) ABSTRACT

A food bar, such as a salad bar, has a cooling system with a refrigerating arrangement, and a cabinet in which pans are arranged. The cooling system is adapted for cooling the food bar such that at least two different climate zones are provided, the cooling of which is separately controllable. The cooling system has one evaporator, a cooling arrangement arranged close to, and above, pan back walls and adjacent a rear section of a covering arrangement adapted to cover pans and so that cooled air flows from a lower edge outward above the pans, and upward in toward an upper edge due to self-convection, forming a first climate zone. Pan holder elements are disposed in the cabinet so disposed that between the pan holder elements and the bottom and lateral walls of the pans, a second climate zone is formed.

27 Claims, 12 Drawing Sheets

(51) Int. Cl.
*F25D 11/02* (2006.01)
*F25D 17/06* (2006.01)
*A47B 31/02* (2006.01)
*F25D 17/08* (2006.01)

(52) U.S. Cl.
CPC .............. *F25D 11/02* (2013.01); *F25D 17/06* (2013.01); *F25D 17/08* (2013.01); *A47F 3/0486* (2013.01); *F25B 2600/112* (2013.01); *F25D 2400/08* (2013.01); *Y02B 40/32* (2013.01)

(58) Field of Classification Search
CPC ...... F25D 2400/08; A47F 3/04; A47F 3/0439; A47F 3/0443; A47F 3/0447; A47F 3/0452; A47F 3/0456; A47F 3/0465; A47F 3/0486; A47B 31/02; F25B 2600/112; Y02B 40/32
USPC .......................................................... 62/246
See application file for complete search history.

(56) References Cited

U.S. PATENT DOCUMENTS

| 5,477,702 | A | 12/1995 | Kennedy et al. | |
| 6,564,569 | B1* | 5/2003 | Havens | A47F 3/0443 62/256 |
| 7,243,506 | B2* | 7/2007 | Spillner | A47F 3/0447 62/258 |
| 7,367,197 | B1* | 5/2008 | Reil | A47F 3/0443 62/258 |
| 2008/0000398 | A1 | 1/2008 | Barkley | |

OTHER PUBLICATIONS

Sweden Patent and Registration Office, Int'l Search Report in PCT/SE2015/050536, dated Sep. 24, 2015.

* cited by examiner

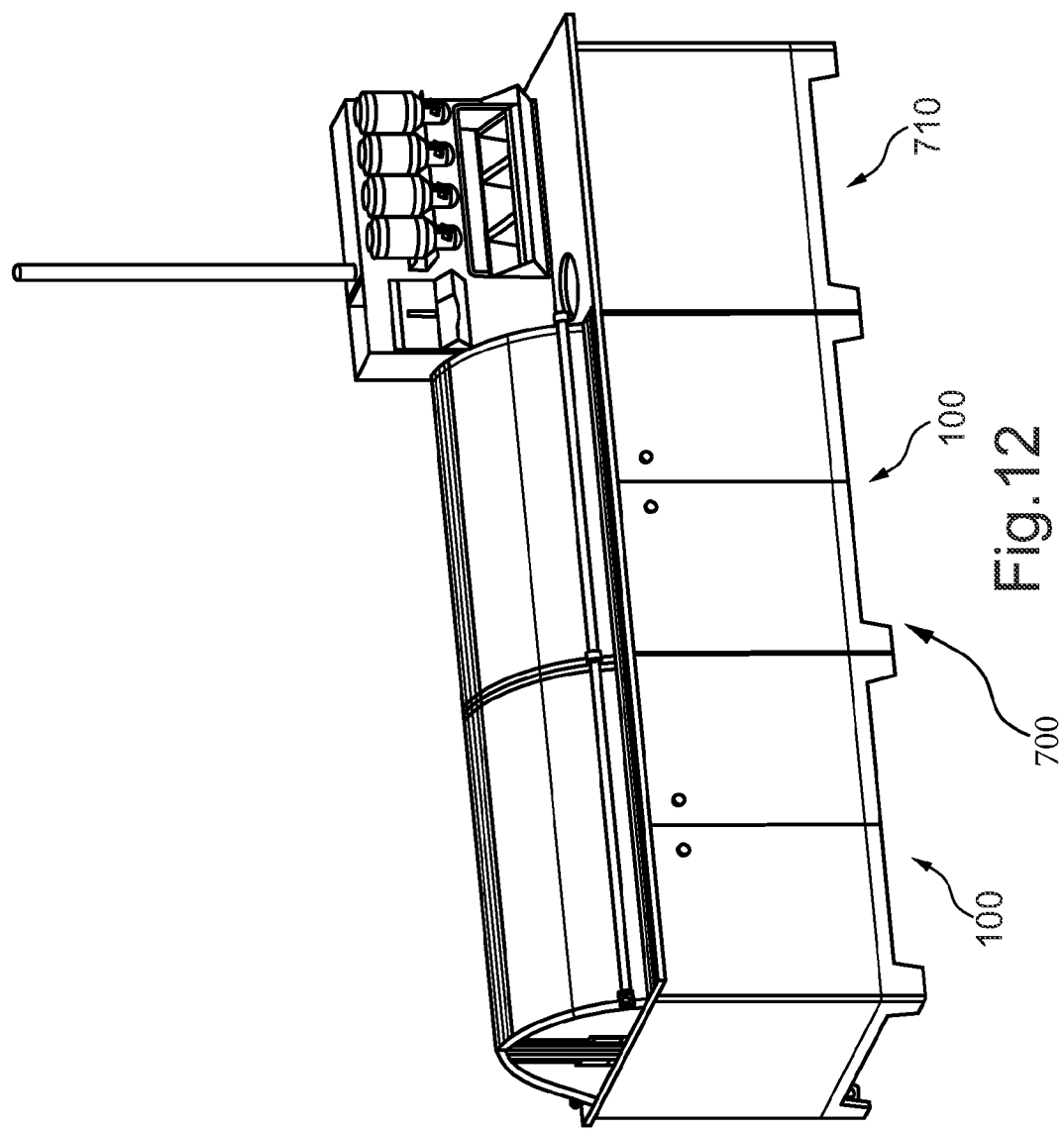

REFRIGERATED FOOD BAR ARRANGEMENT AND A COOLING SYSTEM FOR SUCH A FOOD BAR

TECHNICAL FIELD

The present invention relates to an improved refrigerated food bar arrangement and to a cooling system for cooling a food bar arrangement.

BACKGROUND

In recent times it has become more and more popular to offer fresh food, salads, fruit, vegetables, chicken, but also cooked and prepared food, healthy food etc. from what often is called a salad bar, where the customer can pick and compose a meal from a number of different products kept in canteens or pans. However, since the food products may remain for some time in the pans, which may be accessed by quite a large number of persons, the requirements as to an appropriate and hygienic storing capability are high. The food products also have to be kept under such conditions, and at such a temperature, that bacterial growth is prevented and the products can be kept fresh, appetizing and are not ruined or deteriorated in any way due to the storing.

To be able to maintain an accurate temperature, e.g. above 0° (to avoid that the products be frozen), but below 8° C., or within more strictly specified temperature limits, several different arrangements have been proposed.

Some known arrangements use cooling elements below the canteens, but it is difficult to obtain an even temperature distribution in the food stored in the pans, independently of the location of the food and of the pans in the arrangement. Covering arrangements used to cover and protect the pans with content are frequently opened by customers accessing the food, each time during a shorter or a longer time period, which makes it even more difficult to obtain and maintain an even temperature distribution throughout the food bar.

Known arrangements therefor also use fan blowers for blowing cold air onto the products e.g. from above, or from below or sideways onto the pans. This is however not an entirely satisfactory solution for several reasons. First, it is not satisfactory from a hygienic point of view, bearing in mind that several individuals serve themselves from the pans which means that air contaminated with bacteria etc. may be blown onto the food. Also other particles, e.g. dust, may be blown onto the food. Second, due to the air flow, the food products may be dried out, and ruined, at least from an aesthetical point of view, and the products will not look fresh, which may reduce the willingness of customers to buy and consume the products. Some products may even loose taste and undergo unwanted changes.

These factors contribute in shortening the time period the products can be kept in the pans, and they may have to be disposed of, even if they actually could have been stored for a longer time period, if stored under appropriate conditions.

Third, it is a waste of energy to have fan blowers active all the time and it is difficult to keep an even temperature distribution.

An uneven temperature distribution may also contribute to the production of harmful microorganisms.

When covering arrangements or lids are opened to provide access to the food products, air of a higher temperature will enter the pans, which means that even more cooling is required. If fans are used, the products will then be even more exposed to cool air, and the drying effect will be further increased, which means that the time period that the products can be stored in the food bar will be even shorter. In addition thereto, when the covering arrangements are opened, this will contribute to an even more uneven temperature distribution.

The more often the food bar is accessed, i.e. the more often the cover is opened, the more difficult it will be to maintain an even temperature distribution, and the losses in cooling power will be further increased. In known arrangements the transfer of cooling power from a cooling arrangement may be as low as 30% or even less, the losses thus being considerable. There may also be a considerable spread in the cooling capacity in different parts of a cooling arrangement, or a cooling element, located close to products in e.g. a food bar, which results in it being extremely difficult to control the temperature in food bar pans or similar holding the products, particularly if the allowed or desirable temperature interval within which the temperature may vary is small.

Still further, the whole chain involved in delivering food, loading the canteens or pans, replacing food products, storing food products in the meanwhile, when pans are likely to soon being emptied, the different shelf times of different products, the varying consumption of different products, all are factors that involve a certain problematic as far as intermediate storing, replacement, refilling of pans etc. are concerned.

Today products have to be fetched from a refrigerating facility located distant from the food bar, which means that it is difficult to serve the customers in an optimal manner and timing is difficult if one or more pans are run out of content. It is time consuming as well as laborious for staff to all the time keep up to date information concerning the content, e.g. the filling degree in the pans, and to, at the appropriate moment in time, fetch products from an intermediate storage, involving carrying the pans or the products around in the store, which also may affect the temperature of the products, and the hygienic standard.

SUMMARY

It is therefore an object of the present invention to provide an improved refrigerated food bar arrangement as initially referred to through which one or more of the above mentioned problems can be solved. It is also an object of the invention to provide an improved cooling system for cooling a food bar.

It is a particular object of the invention to provide an arrangement through which high requirements as to hygiene can be met, and which is capable of conferring a stable temperature distribution throughout the food products kept in the pans in the food bar arrangement.

Still further it is a particular object to provide an arrangement which is easy to fabricate, which enables providing of a stable, equal temperature distribution where needed in the bar, which is easy to regulate and which is easy to operate and also is easy to handle from maintenance and cleaning points of view.

Another particular object is to provide an arrangement which is flexible and provides an excellent access to the products for the customers. An object is to provide a high standard refrigerated food bar arrangement, particularly of the type intended for self-service, but also for other purposes, e.g. in canteens in schools or restaurants or imbiss stands when staff are serving the customers.

It is also particularly an object to provide an arrangement which can be operated without requiring the use of any fan blowers, or at least reducing the need for fan blowers.

A particular object is to provide a food bar the cooling of which is controllable, and even more particularly to provide a food bar arrangement through which the food product handling and storing can be improved and facilitated.

Therefore a refrigerated food bar arrangement as initially referred to is provided comprising:
  a holding arrangement configured to receive a plurality of pans for holding food, the holding arrangement including a cabinet and being configured with at least one cold well, the food bar being adapted to hold the plurality pans such that food in the pans is accessible via pan openings to a user at least from a first outer side section of the food bar;
  a cooling system comprising a refrigerator for cooling the food bar in at least two separate climate zones and a cooling arrangement in communication with the refrigerator, the cooling arrangement being arranged with respect to the holding arrangement such that the cooling arrangement is located close to and above a location where back walls of the pans are located when the pans are received in the holding arrangement and adjacent to a rear section of an openable covering arrangement that covers the received pans in a closed position;
  the cooling arrangement being arranged such that cooled air flows in a first cooling flow from a lower edge of the cooling arrangement outward above the received pans, and upward in toward an upper edge of the cooling arrangement due to self-convection, thereby forming a first climate zone;
  the holding arrangement comprises a bottom section disposed at a distance from pan holder elements disposed in the holding arrangement such that the at least one cold well is provided below and on lateral sides of the received pans and forms a second climate zone;
  the cooling system is adapted to separately control cooling of the second climate zone by a separately controlled second cooling flow, and the cooling system comprises a main cooling chamber and a recirculation chamber;
  the refrigerator having a compressor, a condenser, and an evaporator, the evaporator being arranged such that air flows through the recirculation chamber to the evaporator and then the main cooling chamber; and
the main cooling chamber comprises at least one zone outlet for each climate zone, the zone outlets comprising separate zone conduits connected to each respective climate zone, and for each climate zone the cooling system includes at least one separately controllable shunting fan connected to respective zone conduits and configured to separately control cooling of the climate zones by controllable injection of a cooling medium in the climate zones.

A cooling system is therefore also provided comprising: a refrigerating arrangement comprising one evaporator, a main cooling chamber disposed on an output side of the refrigerating arrangement, and a recirculation chamber disposed on an input side of the refrigerating arrangement; and a control system; wherein the main cooling chamber is connected via a number of separate zone conduits to number of climate zones of the food bar; on each zone conduit a zone shunting fan is provided that is in communication with the control system, which separately contols the shunting fans based on information concerning at least temperature in the respective climate zones; the refrigerating arrangement includes recirculation conduits between at least a first climate zone and the recirculation chamber; the first climate zone has a cooling arrangement located above and at a rear side of pans held in the food bar for cooling the first climate zone, the first climate zone comprising a zone above held pans under an openable cover element, such that the first climate zone is substantially closed when the cover element is in a closed position; a second climate zone comprises one or more troughs surrounding bottom and latral walls of held pans; and the evaporator cooperates in cooling two or more climate zones that are separately controllable.

Advantageous embodiments are given by the respective appended dependent claims.

BRIEF DESCRIPTION OF THE DRAWINGS

The invention will in the following be further described, in a non-limiting manner, and with reference to the accompanying drawings, in which:

FIG. 12 is a very schematic illustration of an exemplary embodiment of a food bar arrangement assembly according to the invention.

DETAILED DESCRIPTION

Figure 1:
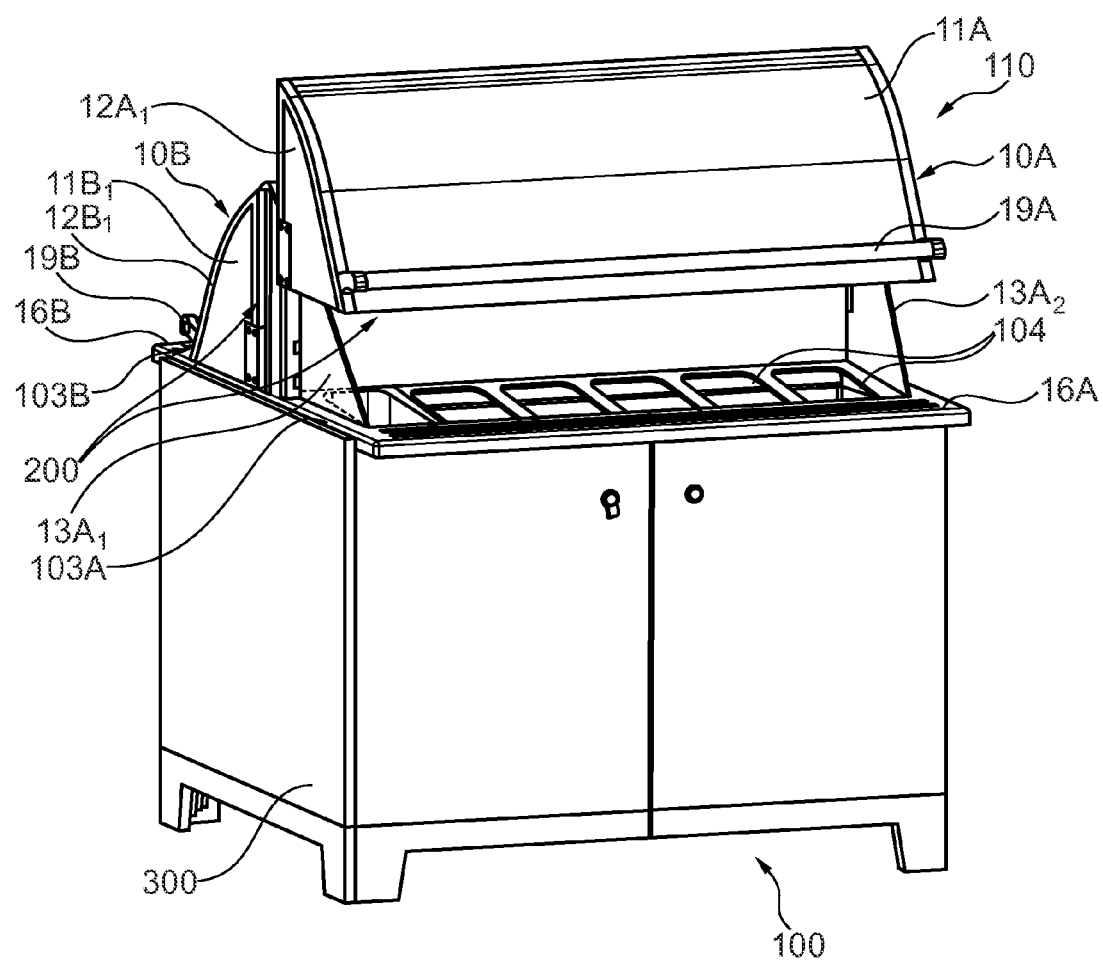
FIG. 1 is a schematic external view in perspective of an exemplary a food bar arrangement according to the invention.

FIG. 1 shows a food bar arrangement 100 according to a first embodiment of the invention comprising an openable/closable covering arrangement 110 with two covering elements 10A,10B adapted to cover canteens or pans 104 (in the following only denoted pans) arranged in a holding arrangement 103A,103B of the food bar arrangement comprising a cabinet (also called or cupboard or bench arrangement) 300 with tray slides 16A,16B. It should be clear that the food bar arrangement 100 does not have to comprise a covering arrangement 110 as shown in FIG. 1, and as discussed in the Swedish patent application 1450649-7 filed on May 29, 2014 by the same applicant, and priority from which is claimed. Other covering arrangements may also be used, but, in a closed position, a space has to be left allowing air to flow above the food/the pans and below the covering arrangement.

It should also be clear that a covering arrangement 110 does not have to comprise two covering elements for a dual sided food bar, but there may be one covering element for a dual-sided food bar, or the bar may be a single-sided food bar (or a food bar with more sides etc.). A number of aligned food bar arrangements may be arranged to form an assembly (see FIG. 12), or a food bar with several adjacent, separate, covering arrangements, each with one or more covering elements, may be provided.

However, in the particular, illustrated embodiment, the food bar arrangement 100 comprises one or more holding arrangements 103A,103B in which a plurality of pans 104 are to be disposed, in pan holders 106A,106B. It further comprises a cooling system with a refrigerating arrangement. The cooling system comprises a cooling arrangement 200 for cooling the pans, and hence the food products provided therein, for keeping the food products at a desired temperature, e.g. above 0° but below 8° C., or within a more specified temperature interval. The cooling system according to the invention is adapted to cool, and allow for separate control the cooling of at least two different climate zones, or so that at least two different climate zones are provided. A first climate zone here comprises the cooling arrangement 200 as will be further discussed below.

The holding arrangement(s) 103A,103B is/are comprised in, or may be connected to or provided in one or more cabinet arrangements 300, and form or comprise cold wells, also called troughs, which are adapted to receive and hold the pans in such a manner that the food is accessible for a customer by means of substantially upwards directed openings of the pans from a first and a second outer side section 150A,150B (cf. FIG. 2) of the holding arrangements 103A,103B, hence allowing a customer to choose and pick from the pans from two sides (here). The pans may alternatively be held by separate means, e.g. of a mounting arrangement of the food bar, such that the will be disposed in the holder elements as discussed above. The holding arrangement(s) may comprise an isolating arrangement included in or connected to a mounting arrangement of the food bar.

The covering elements 10A,10B are adapted to cover the pans 104 from above so that the content is protected in time periods between customers accessing the content etc.

The covering elements 10A,10B can be transferred from an open position or an open state, in which access to the content in the pans is provided. In FIG. 1 covering element 10A is in an open state whereas covering element 10B is in a closed position preventing access and protecting the content in the pans 104 on one side of the food bar. Each covering element 10A,10B in this embodiment comprises a front section 11A,11B exhibiting a vaulted shape, a rear section (not shown) and two side sections 12A$_1$, 12A$_2$, 12B$_1$, 12B$_2$ (not all shown in FIG. 1) interconnecting respective opposite outer edges of the respective front and rear sections in such a manner that two covering hoods or similar are formed with one another facing, and extending in parallel to one another, substantially plane rear sections, which in a mounted state of the covering arrangement are disposed in a vertical manner, forming rear walls. The edges of the first side sections 12A$_1$, 12A$_2$, 12B$_1$, 12B$_2$ connecting to, or being arranged adjacent to, the rear sections are vertically disposed (in a mounted state) whereas the edges connecting to the front sections taper upwardly to a location where front and rear section upper edges meet or are joined by means of a frame structure.

Said rear walls, or rear sections, are in an advantageous embodiment disposed at a distance from one another, leaving space for the cooling arrangement, also called a cooling element 200, particularly a cooling tower, between them. The upper end of the cooling tower 200 in some embodiments is contiguous with the upper end of a mounted covering arrangement 100 (when the covering elements are in their closed positions).

In other embodiments the cooling element 200, or the covering arrangement 110, is adapted to have such a height that the upper end of the cooling element 200 will be disposed below the position assumed by the upper end or edge of the covering element(s) in its (their) closed position. Alternatively the cooling element(s) protrudes above the covering arrangement in its closed position, although its active portion, as far as its cooling functionality is concerned, preferably terminates at the upper end or edge of the covering arrangement.

Each covering arrangement 10A,10B is here equipped with an actuating element 19A,19B, e.g. a gripping element, a handle or similar by means of which a user, e.g. a customer, accessing the products in the pans, can bring the covering arrangement 10A,10B from a closed position to an open position and vice versa. In the shown embodiments the actuating elements 19A,19B extend along, adjacent, the lower ends of the front sections 11A,11B. The actuating elements may of course be of any other form or shape, disposed in any different manner, the purpose being to facilitate opening/closing of the covering arrangement. Preferably actuating elements 19A,19B are disposed all along the long side of the food bar, so that a customer in front of the food bar can open/close the covering element with ease irrespective of his current position.

The front section 11A,11B of a covering element 10A, 10B is preferably made of a transparent material, e.g. of any appropriate plastic material known in the art. The side sections and the rear sections may according to different embodiments be made of the same material as the front section, or of other appropriate materials, which may be the same or different for the side and the rear sections. Particularly also the side sections are made of a transparent material.

In order to transfer a covering element 10A,10B from a closed to an open position, it is moved in a vertical direction between a first, lower, position, the closed position, (covering element 10B in FIG. 1), in which it substantially is in contact with an upper side of a holding arrangement 103A, 103B, preventing access to the pans, and a second, upper position (covering element 10A in FIG. 1) in which access is provided to the pans in the food bar.

The covering elements 10A,10B are movable between said first, closed, and said second, open, positions by means of the covering arrangement, here, further comprising, or being connected to, a mounting (and driving) structure comprising guide rails in which a slide or pulley mounted on the covering element can run.

In order to bring a covering element 10A,10B from a closed position to an open position, a slight force has to be overcome to allow it to subsequently to slide or move upwardly, substantially with no resistance, until it reaches the upper, open, position. Vice versa, when it is to be moved from the upper, open, position to the lower, closed, position, a slight force, somewhat higher than the slight force referred to above for the closing operation, has to be overcome after which it is moved automatically slowly downwards. Such opening and closing movements can be achieved in different manners as will be discussed below. As another option, gas springs can be used to allow the covering elements slide upwards and downwards with respect to a/the vertical mounting structure.

The mounting structure may be provided with vertically disposed guide rails arranged in parallel for cooperation with the respective rear outer edges of a single cover element, or it may be a dual mounting structure adapted to receive two covering elements 10A,10B as in FIG. 1, which independently can slide up and down by means of respective guiding rails as will be further described below. It should however be clear that the transfer between an open, upper, position and a closed, lower, position can be achieved in many different ways, however, if the covering element is moved by means of a vertical translation between an open and a closed position, it will not sweep out over the tray slide during the movement, in addition to the other advantages discussed herein.

Another important feature in this particular embodiment is the provisioning of the first side sections $12A_1$, $12A_2$, $12B_1$, $12B_2$, and in particular of second, preferably, but not necessarily, fixed or detachably mountable, second side sections or additional side walls $13A_1,13A_2$, $13B_1,13B_2$ (the latter not shown in FIG. 1). Said second side sections $13A_1$, $13A_2$, $13B_1$, $13B_2$ in advantageous embodiments have substantially the same, or a similar, shape as the first side sections $12A_1$, $12A_2$, but with slightly reduced dimensions so as to admit the first side sections to, in a closed position of the covering elements, be disposed on the outer sides of said second side sections, at a slight or minor distance therefrom, and in such a manner that said second side sections will be located closest to the pans. Said second side sections will contribute in maintaining an even temperature distribution since it will prevent cool air from escaping from the region above the pans when the covering element is in an opened position, and prevent warm air from entering.

Thus, through the particular arrangement of the rear sections of the covering elements adjacent to a cooling element, and movably with respect thereto, such that when a covering element is in an open position, the rear section is moved upwards, exposing a larger area of the cooling element, hence resulting in an increased cooling of the pans, and further the implementation of the second side sections, the covering arrangement will, to a considerable extent, contribute to keeping an even temperature distribution in the food bar.

The cooling arrangement 200 is in different advantageous embodiments arranged with respect to, or in, a holding arrangement 103, or in the pan holder elements, such that, when the pans 104 are taken up therein, each pan or canteen back wall, distant from an opposite canteen front wall located adjacent an inner side of the holding arrangement 103 at its outer side, where customer access is provided, will be located close to, facing it, preferably throughout the entire area forming the back wall.

The holding arrangement 103 in one embodiment, to which the invention however by no means is limited, comprises holding means, (or pan holder elements, cf. e.g. FIG. 9), in which the canteens or pans are disposed or held in an inclined position such that outer, upper, ends or side edges, of the pans will be disposed at a lower level than opposing inner, upper ends, or side edges. Bottom sections of the holding arrangement may be disposed such that a distance is left between the bottom surface of the holding arrangement, forming a cold well, and the bottom portions of the pans, and particularly between the respective pan bottom section and pan holder element, and the pan holder element and the holding arrangement; cf. FIG. 9.

At least a part of the cooling arrangement 200 will be located adjacent the outer sides of the back walls of the pans in a mounted position in a holding arrangement.

In alternative embodiments a covering arrangement, and/or a holding arrangement substantially as disclosed in PCT/SE2014/000028 claiming priority from Swedish patent application No. 1350368-5 may be used.

In the advantageous embodiment shown in FIG. 1, the holding arrangement 103 is adapted to receive one or more rows of pans 104, or pan holder elements with pans, the cooling arrangement 200 protruding in a central portion of the bar arrangement to a height substantially in line with the upper edges of rear sections, or rear walls, of the covering elements 10A,10B when they are in a closed position. If the covering arrangement comprises but one covering element 10A or 10B, the rear section of such covering element is located adjacent the cooling arrangement 200.

The pans in each row may be also in an embodiment as disclosed in FIG. 1 be held in an outwardly inclined position, e.g. so as to form an inclination angle $\alpha$ of between 5° and 10°, preferably between 6° and 9°, most preferably around 7.5° with a horizontal plane as in the above mentioned PCT/SE2014/000028, or alternatively at any other appropriate inclination angle, even including an in inclination angle of 0°.

As referred to above, different types of covering arrangements can be used. A covering arrangement may have different form and shape, it may be split into different sections; one for each a holding arrangement, or one section for two or more holding arrangements in a row. It may comprise a common mounting structure allowing separate opening and closing of two or more covering elements, or with separate mounting structures for each a covering element, the latter allowing an even more flexible assembly of independent modular single-sided food bar arrangements.

The food bar arrangement 100 in FIG. 1 comprises cabinets 300 provided with doors, which may, in addition to a machine room comprise a refrigerating arrangement, e.g. comprising two refrigerators, forming a second climate zone, and/or, optionally, a thawing unit, forming a fourth climate zone.

Figure 2:
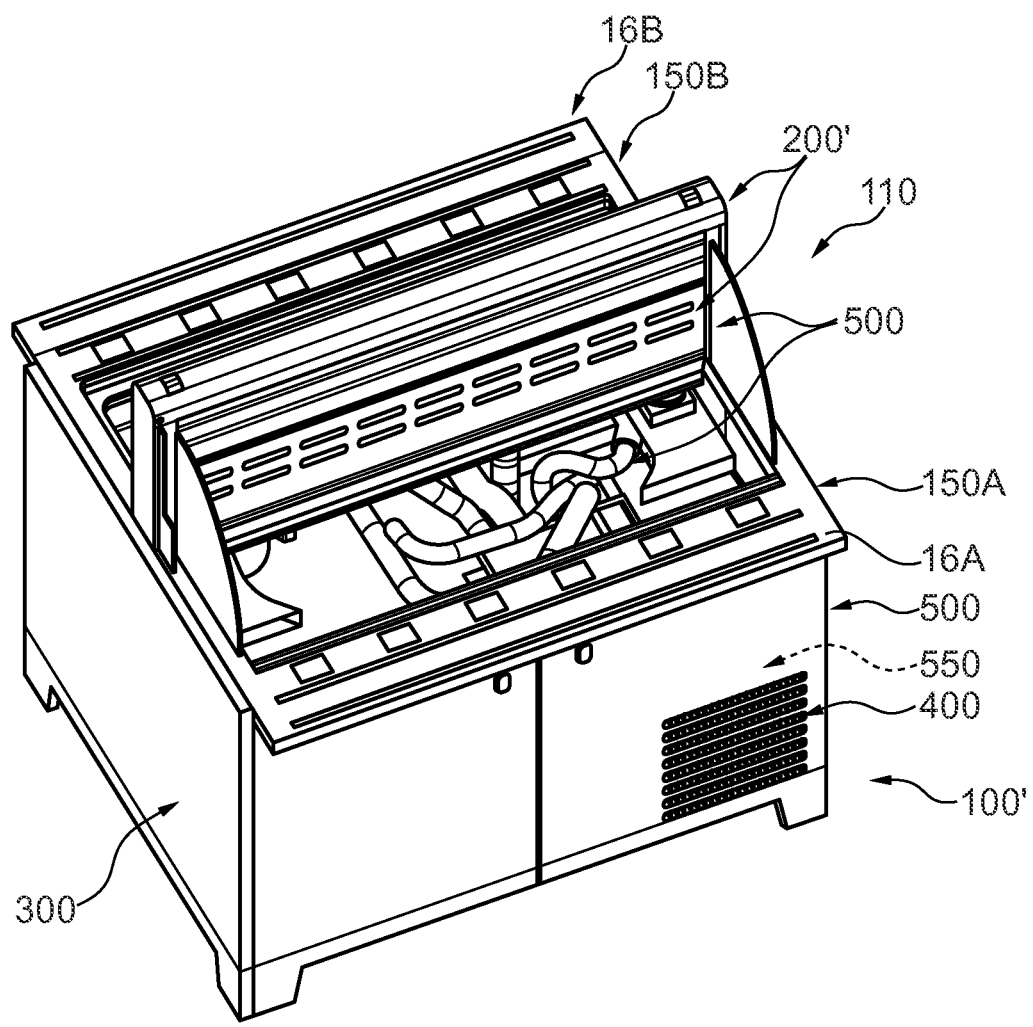
FIG. 2 is a schematic view in perspective from above of the food bar arrangement in FIG. 1.

FIG. 2 very schematically illustrates a food bar arrangement 100' with a cooling arrangement 200' as will be further described below with reference to FIGS. 7,8, and with a covering arrangement 110 as discussed above with reference to FIG. 1. Second cooling element plates of the cooling arrangement 200' are here provided with gills 221A', 222A' which are shown through the transparent front section of the covering element, and the front covering element is supposed to be in an open position such that gills arranged in upper and lower rows are all uncovered.

FIG. 2 also shows the cabinets 300, and the machine room 400 is schematically illustrated which comprises an evaporator and a compressor of the refrigerating arrangement 550 which is in communication with the cooling arrangement 200', and also comprised in the cooling system 500, which also comprises conduits to/from different climate zones as will be discussed below.

Figure 3:
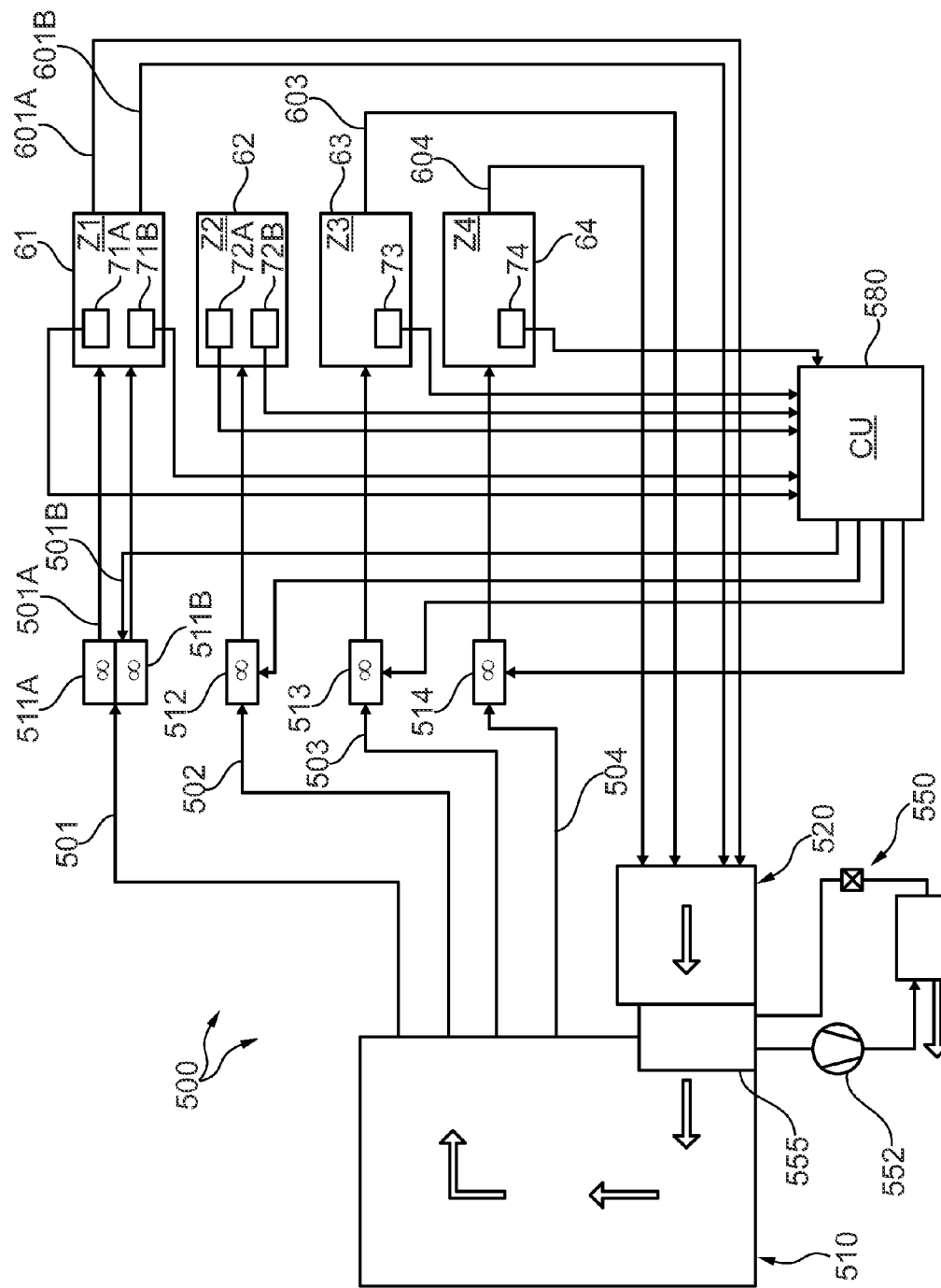
FIG. 3 is a schematic block diagram of a cooling system for a food bar arrangement according to the invention.

FIG. 3 is a schematic block diagram of the main functional entities of a food bar arrangement according to one embodiment of the invention.

It comprises a cooling system 500 comprising a refrigerating system 550 including a condenser 551, a compressor 552 and an evaporator 555. The functioning of such a refrigerating system will not be further described since it is supposed to be known to the man skilled in the art, and it may be of substantially any known, appropriate kind.

The cooling system is arranged to comprise a first or main cooling chamber 510 provided on the output side of the evaporator 555, or after the evaporator, and a pre-cooling chamber or a recirculation chamber 520 on the input to the evaporator, i.e. before the evaporator in the cooling medium flow direction. It is also defined as comprising a cooling arrangement 200 comprising a cooling tower for cooling in the first zone as will be further explained below. The evaporator 555 is connected to a plurality of zone conduits 501,502,503,504, at least one connecting to or communicating with each a climate zone, here four different climate zones Z1,Z2,Z3,Z4, for cooling of said zones. On the respective zone conduits speed controlled shunting fans 511A,511B,512,513,514 are provided for the respective climate zones.

The temperature of the main cooling chamber is controlled to hold a temperature of approximately between −15° C. and −20° C., substantially never below −20°, which normally is the coolest temperature the shunting fans can tolerate. It can alternatively be controlled to have any other temperature that is tolerable by the shunting fans. (The temperature at the evaporator is between about −20° C. to −25° C.)

Figure 7:
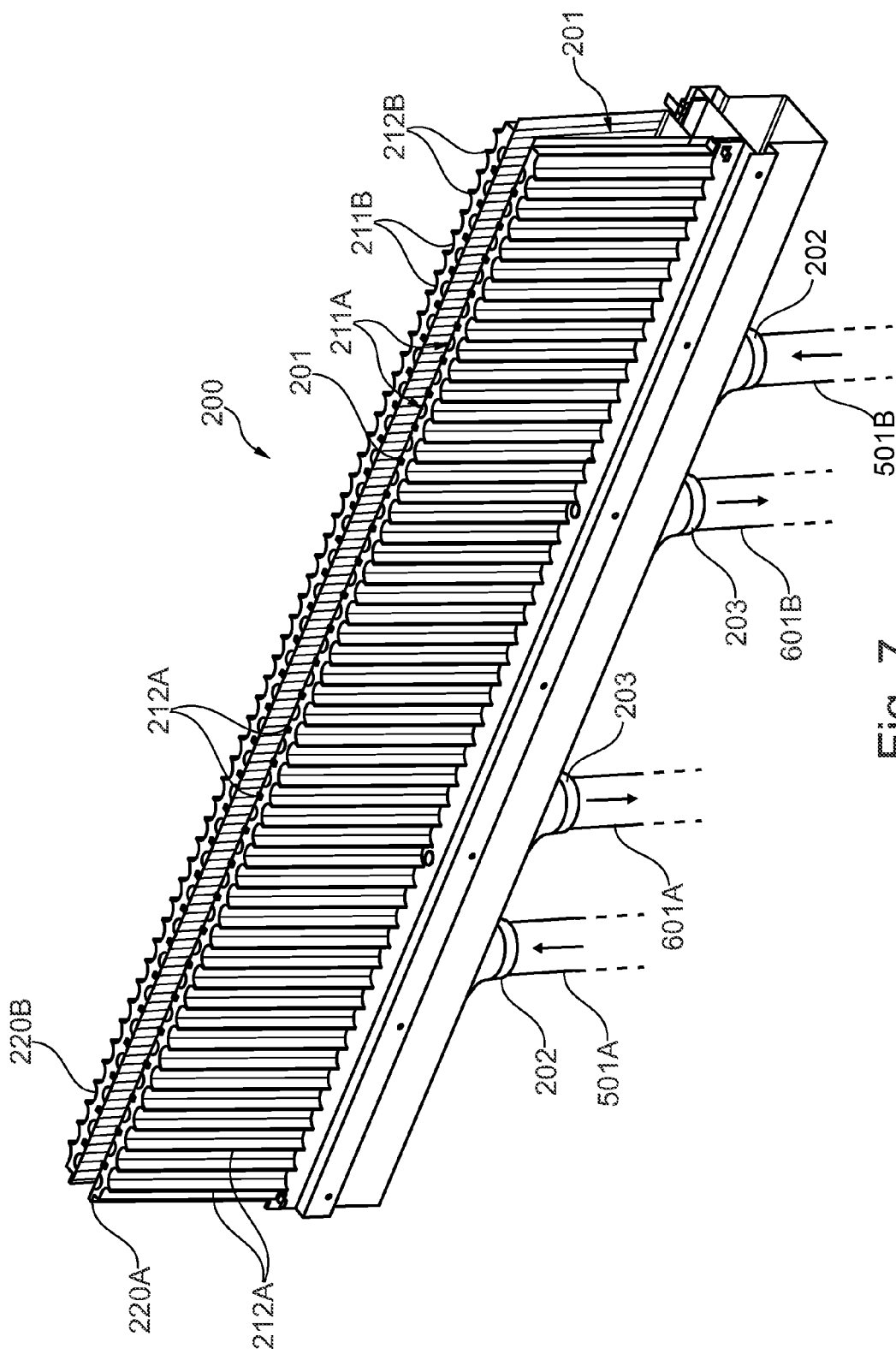
FIG. 7 shows a cooling arrangement for cooling a first climate zone according to a particular embodiment of the invention.
Figure 8:
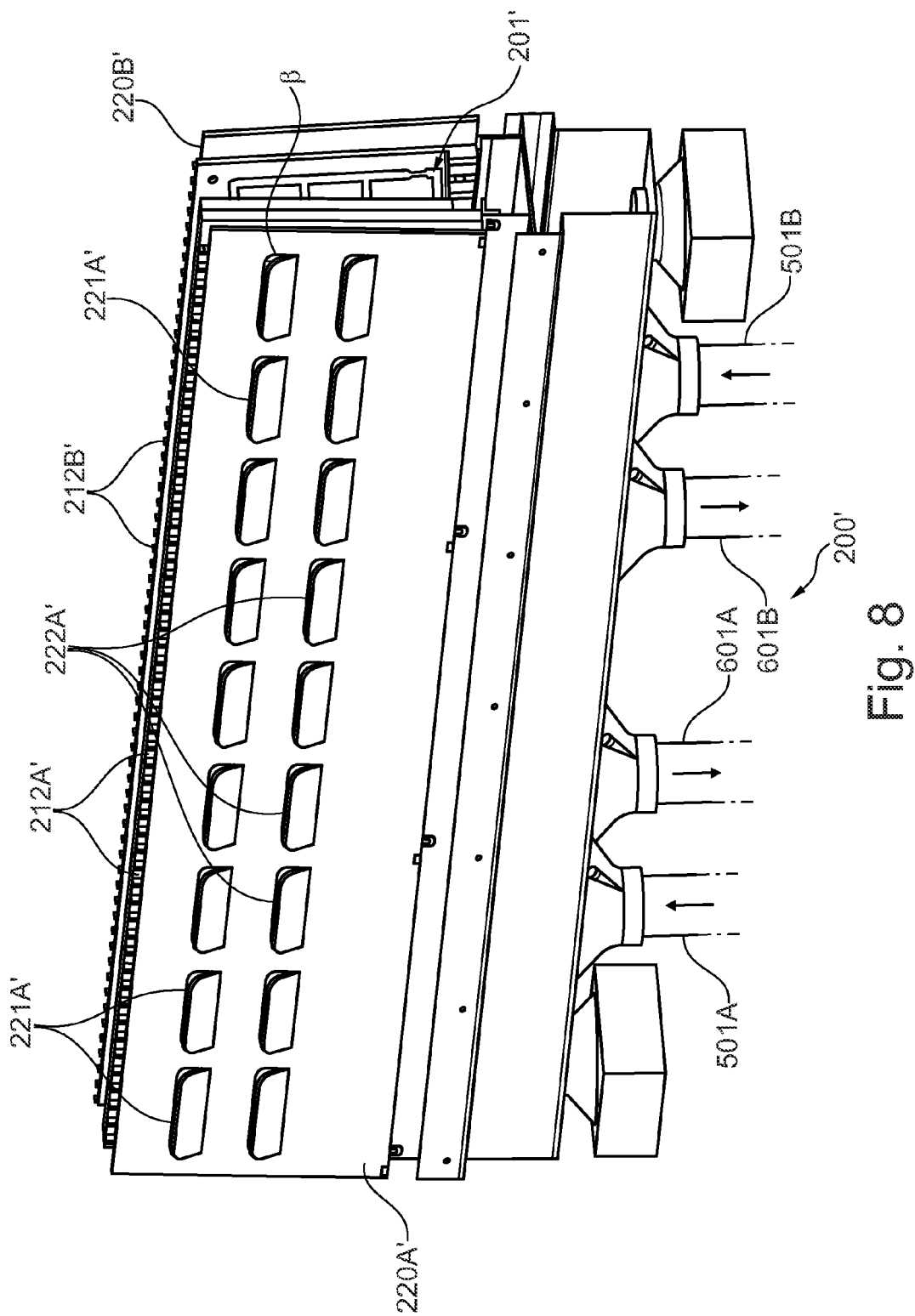
FIG. 8 shows a particular implementation of a cooling arrangement of a cooling system according to the invention, FIG. 9 schematically illustrates cooling of a first and a second climate zone according to one embodiment of the invention.
Figure 9:
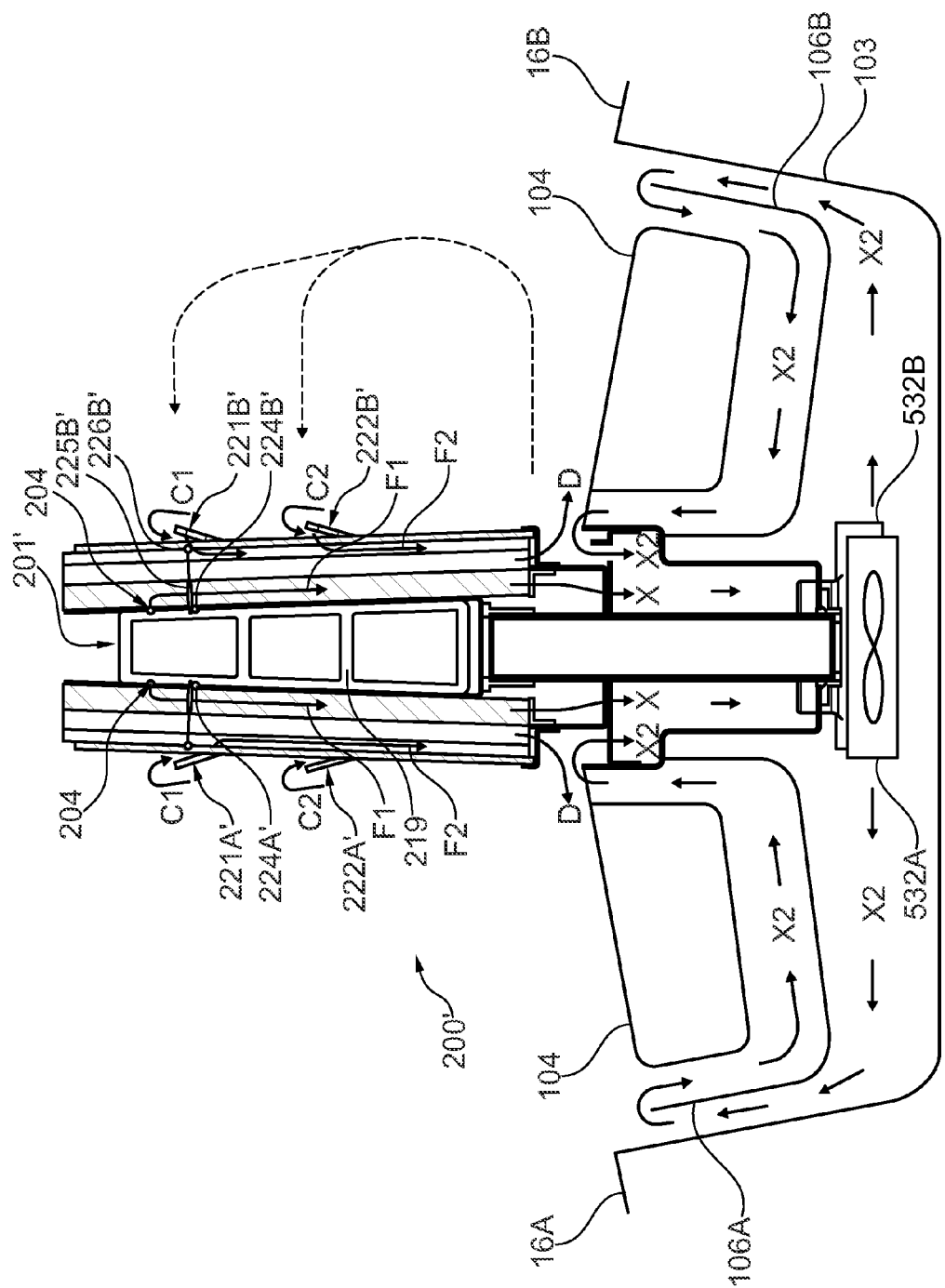

In the shown embodiment a first zone conduit 501 is used for, carrying cooling medium (cooled air), assisted by two shunting fans 511A,511B, to the cooling arrangement 200, 200' of, or for cooling the first zone Z1 via two separate zone conduit inlets 501A,501B (cf. FIGS. 7-9, where the symmetrically disposed inlets 202,202 are indicated). Instead of two (or more) shunting fans, one fan with a high power might be used to assure a high flow to the cooling arrangement, comprising the cooling tower.

The first climate zone Z1 61 comprises at least two temperature sensors 71A,71B for sensing the temperature on each side of the cooling arrangement 200, i.e. in the first zone Z1. The temperature sensors are connected to a control unit 580 which is common for all the zones, and information on the temperature in the zone is continuously, or at discrete time intervals, provided to the control unit, which in turn is in communication with the shunting fans 511A,511B for controlling the speed thereof at least depending on the sensed temperature.

The first climate zone Z1 also is connected to the prechamber or the recirculation chamber 520 of the cooling system 500 by means of recirculation conduits 601A,601B (cf. outlets 203 in FIG. 7) allowing air to recirculate from the first zone, which hence forms a substantially closed system.

The temperature in the recirculation chamber will be about −3° C., the difference in temperature between the main cooling chamber 510 and the recirculation chamber hence being about 15° C.

In a similar manner a zone conduit 502 is provided from the main cooling chamber 510 to the second zone Z2 62 comprising the cold wells or the trough(s) (see FIG. 9). A shunting fan 512 is provided on the conduit 502, the speed of which is separately controlled via signals from the control unit 580, to which information about the temperature in the second zone Z2 62 is provided by means of temperature sensors 72A,72B in the trough, at least one on each side for a dual sided food bar. However, there are no return conduits from the second zone Z2 62, and the cooled air is not recirculated, but it is allowed to flow out on the tray slides. The provisioning of a return conduit might result in air in the trough leaking into one of the other zones, e.g. due to a problem such as a malfunctioning valve or any other cooling problem in a zone, by means of a back suction flow. Thus, instead of using a recirculation conduit, air escaping from the second zone is replaced by means of a separate input, e.g. to the main cooling chamber 510 (see FIG. 3), i.e. arranged after the evaporator 555.

Particularly the temperature in the first zone, above the pans, is controlled to be about 2° C.

The second zone Z2 62 receives cooled air in two ways, from the cooling arrangement 200 (see e.g. FIG. 9) and via the zone conduit 502 whereby cooled air controllably can be shunted in.

In the second zone Z2, the temperature should preferably be about 2° C., although in principle also other temperatures can be used, the main issue being that the temperature can be efficiently and separately controlled to have the desired value.

Also the third zone Z3 63 comprises a temperature sensor 73 for sensing the temperature, information on which is provided to the control unit 580, for regulating the speed of a shunting fan 513 on the third zone conduit 504 from the main cooling chamber. The third zone 63 here comprises a refrigerator. It is provided with a recirculation conduit 603 as discussed above with reference to the first zone Z1 61.

The food bar arrangement in this embodiment also comprises a fourth zone Z4 64 comprising a thawing unit. A fourth zone conduit 504 is provided between the main cooling chamber 510 and the fourth zone, which further also is connected to the recirculation chamber 520 by means of a recirculation conduit 604. The fourth zone also comprises a temperature sensor 74 which is in communication with the control unit 580, for separate regulation of the speed of a shunting fan 514 on the fourth zone conduit 504. As will be explained below with reference to FIG. 4, the thawing unit comprises a heating element, which is also connected to the control unit 580. The thawing unit may comprise a refrigerator which further comprises said heating element.

Thus, for a plurality of climate zones it is possible to use one common evaporator, and for each climate zone, separate shunting fans are provided, the speed of which can be separately controlled. Hence, according to the invention additional cool air is shunted into the respective zones by the respective shunting fans when needed, and to the extent that is needed in the respective zone, e.g. depending on the detected temperature in the zone with respect to a desired or needed temperature.

The cool air circulating under the covering elements is not fan driven.

In an advantageous embodiment the food bar arrangement may comprise two refrigerators (third zone) arranged back to back, and a thawing zone (forth zone) disposed behind, or on the backside of, the machine house comprising the refrigerating arrangement. The length of such a food bar arrangement (cabinet) may be 1200 mm, a standard length for transportation within Europe, hence facilitating transportation and storing.

Figure 4:
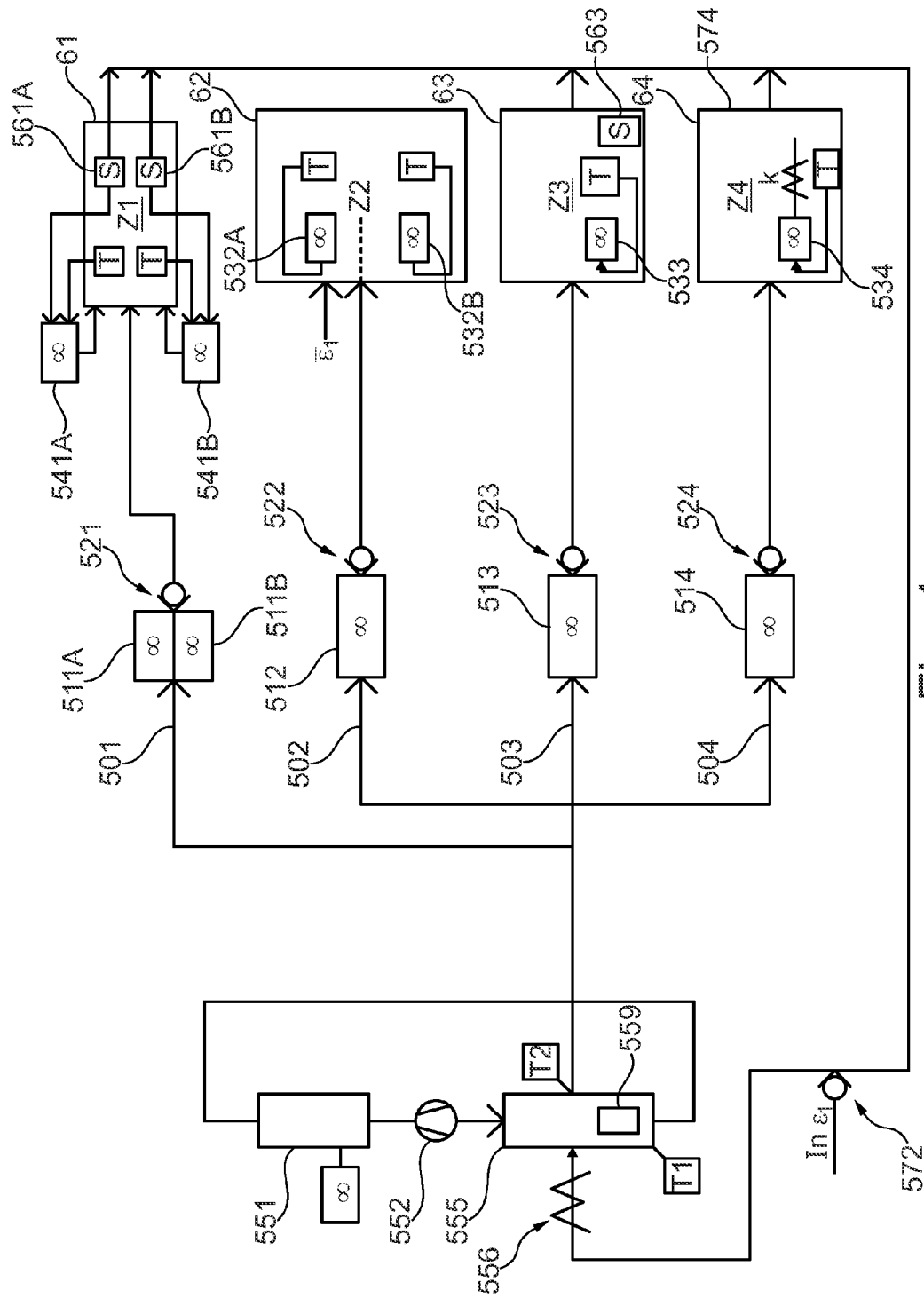
FIG. 4 is a schematic block diagram somewhat more in detail of an exemplary embodiment of a food bar arrangement with a cooling system according to the invention, FIG. 5 schematically illustrates a cooling system for a food bar arrangement according to the invention, FIG. 6 schematically illustrates a cooling system with a cooling arrangement for a food bar arrangement according to one embodiment of the invention.

FIG. 4 is a block diagram as in FIG. 3, but not including the communication with the control unit and the main and recirculating chambers for reasons of clarity, and instead specifically illustrates additional elements that in advantageous implementations are included in the arrangement.

In order to melt ice generated in the evaporator 555 a defrosting arrangement is provided. In one embodiment it comprises a heating arrangement 556. In an alternative embodiment a catalytic frost eliminator device 559 is provided in the evaporator 555, which has shown to be very efficient, and also of advantage from a security point of view, since it might replace an electric cooling device in a humid environment. In still another embodiment both a heating device and a catalytic frost eliminating device can be used, i.e. allowing the heating device to be switched on only when needed.

A fan 551 is provided on the condenser, and temperature sensors T1,T2 are provided for sensing the temperature before and after the evaporator, which in most embodiments is not allowed to have a temperature below −20° in the main cooling chamber in order not to ruin the shunting fans.

As discussed with reference to FIG. 3, zone conduits 501,502,503,504 are provided for conducting the cooling medium to the respective zones 61,62,63,64, and on which speed regulated shunting fans 511A,511B,512,513,514 are provided. After each shunting fan a respective non-return valve 521,522,523,524 is provided to prevent any back-flow from the respective climate zone.

Recirculation conduits are provided from the first, third and the fourth zones 61,63,64 as discussed above. To replace the leakage of cooled air from the second zone 62 (the trough), there is provided an inlet 572 (comprising a non-return valve) which preferably is disposed before the evaporator. $\in_1$ here indicates the external injected cool air to the system, $\overline{\in}_1$ the air input to the second zone Z2. If there is no leakage, $\in_1 = \overline{\in}_1$.

The first zone Z1, comprising the cooling tower 200, may comprise two fan blowers 541A,541B as discussed with reference to FIG. 9, which however may be optional, and/or only activated if there is a need of additional cooling. In that case, however, air is blown downwards, on the outside of the cooling tower or as discussed with reference to FIG. 9. They may alternatively be disposed of.

Position or motion sensors S 561A,561B are provided in the first zone 61 for registering the position of the covering elements.

Information on whether a cover element is closed or opened, or moved from a closed position and/or vice versa, is provided to the control unit (see FIG. 3). If a cover element is opened, more cooling power is needed, and the rotation speed of the shunting fans 511A,511B, and optionally, also of circulation fans 541A,541B, if such are provided, is increased by means of the control unit 580, receiving information on the opening state of the cover elements by means of a position or motion sensor.

Also the third zone comprising a refrigerator comprises a position or motion sensor S 563 for detecting if a door is open or being moved from the closed position etc., in which case information thereon is provided to the control unit 580, which provides a signal to, or in any appropriate manner regulates, the shunting fan 513 (and the circulation fan 533). Optionally also the fourth zone 64 comprises a position or motion sensor.

The second zone 62 is in an advantageous embodiment provided with circulation fans 532A,532B (one for each side of the food bar arrangement, each trough or each side of a common trough) in the holding arrangement, which also are controlled by the control unit 580 based on temperature information. If the temperature is too high, or exceeds a predetermined value, the speed of the shunting fan, and of the circulation fan(s) is/are increased and vice versa.

Also the third zone comprises a circulation fan 533 which also is controlled by the control unit depending on the detected temperature in the refrigerator with respect to a predetermined value. Further, information on the opening state, sensed by a position or a motion sensor 563, of the door of the refrigerator, is used to switch off the circulation fan 533 if the door is open or opened, and vice versa.

In an advantageous embodiment the circulation fans in the second and the third zones are run at a constant rotational speed of e.g. 80%, and switched off if the cover elements or the doors are opened.

The fourth zone 64 (the thawing unit) also comprises a circulation fan 534, and in addition thereto a heating element 574. The circulation fan 534 and the heating element 574 are controlled via the control unit based on information on the temperature as detected by the temperature sensor in the fourth zone.

In alternative embodiments one or more of the circulation fans are controlled by a separate control function, also having access to temperature and possibly opening state information.

Figure 5:
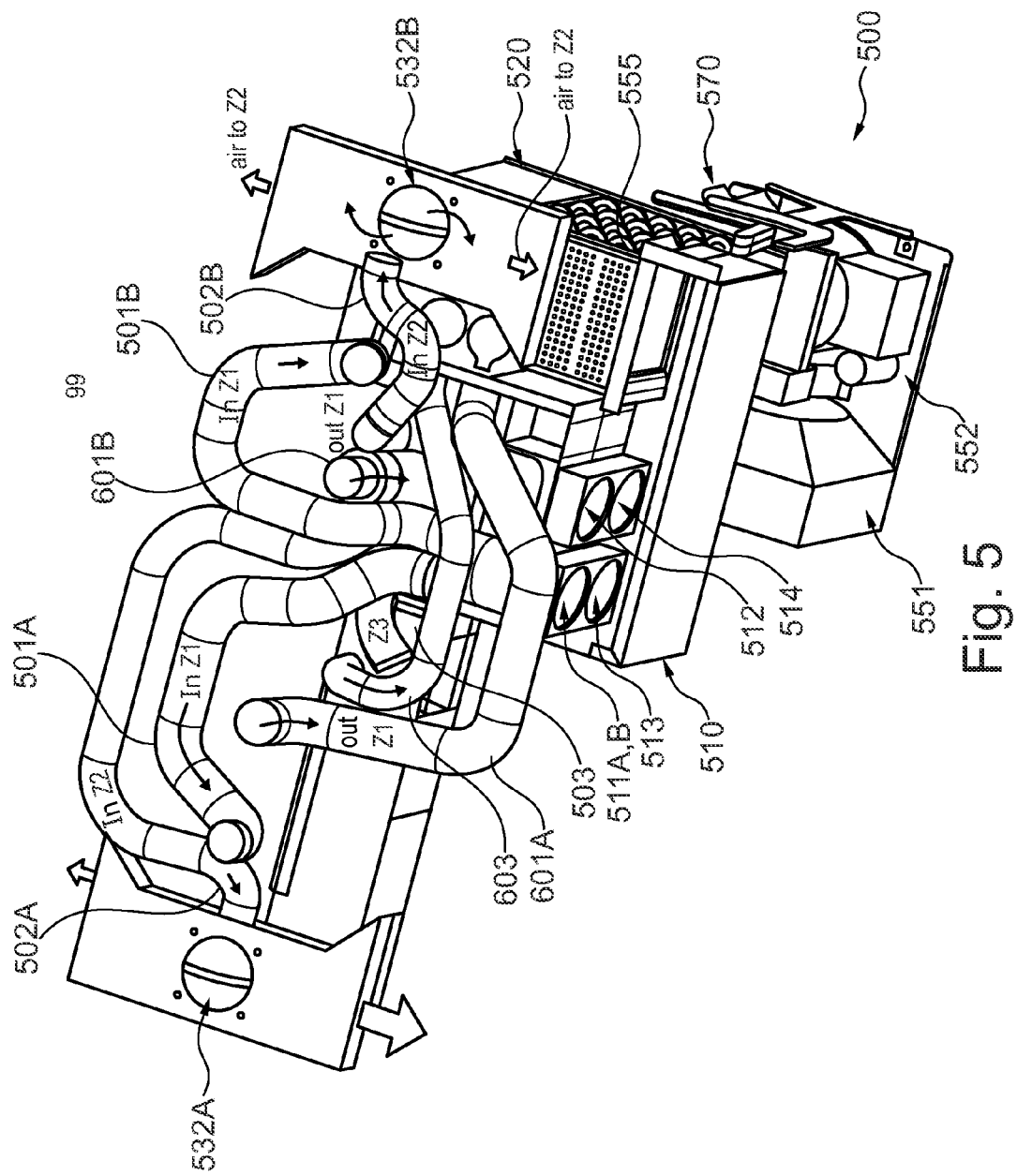

FIG. 5 illustrates a cooling system 500 without the cooling arrangement 200 for reasons of clarity. The compressor 552, the condenser 551 and the Cu-tubing 570 for the cooling medium are merely schematically indicated and will not be further discussed, since the functioning thereof is supposed to be known within the art. The evaporator 555 is here located below the second zone Z2 wherein the pans are held. The main cooling chamber 510 is located after the evaporator 555, and the recirculating chamber 520 is disposed before the evaporator in the flow direction of the cooling medium. The shunting fans 511A,511B,512,513,514 are used for shunting cooled air into the respective zones, via symmetrically disposed zone conduits 501A,501B up into the cooling arrangement 200 comprising he cooling tower, via zone conduits 502A,502B to the second zone comprising the troughs or cold wells, and via zone conduit 503 to the third zone comprising the refrigerating arrangement respectively. The zone conduit to the fourth zone is not shown. Via symmetrically disposed recirculation conduits 601A,601B air is recirculated from the first zone Z1, comprising the cooling arrangement 200, to the recirculation chamber 520. Air is also recirculated via recirculation conduit 603 from the third zone. The recirculation conduit from the fourth zone is not shown.

The circulation fans 532A,532B of the second zone Z2 are shown, on opposite sides of the conduits, and from which air is blown out in two opposite directions, in under the pans held therein.

The flow to the cooling tower (zone Z1) is similar in both first zone conduits 501A,501B. The first zone comprising the cooling tower forms a closed system.

Figure 6:
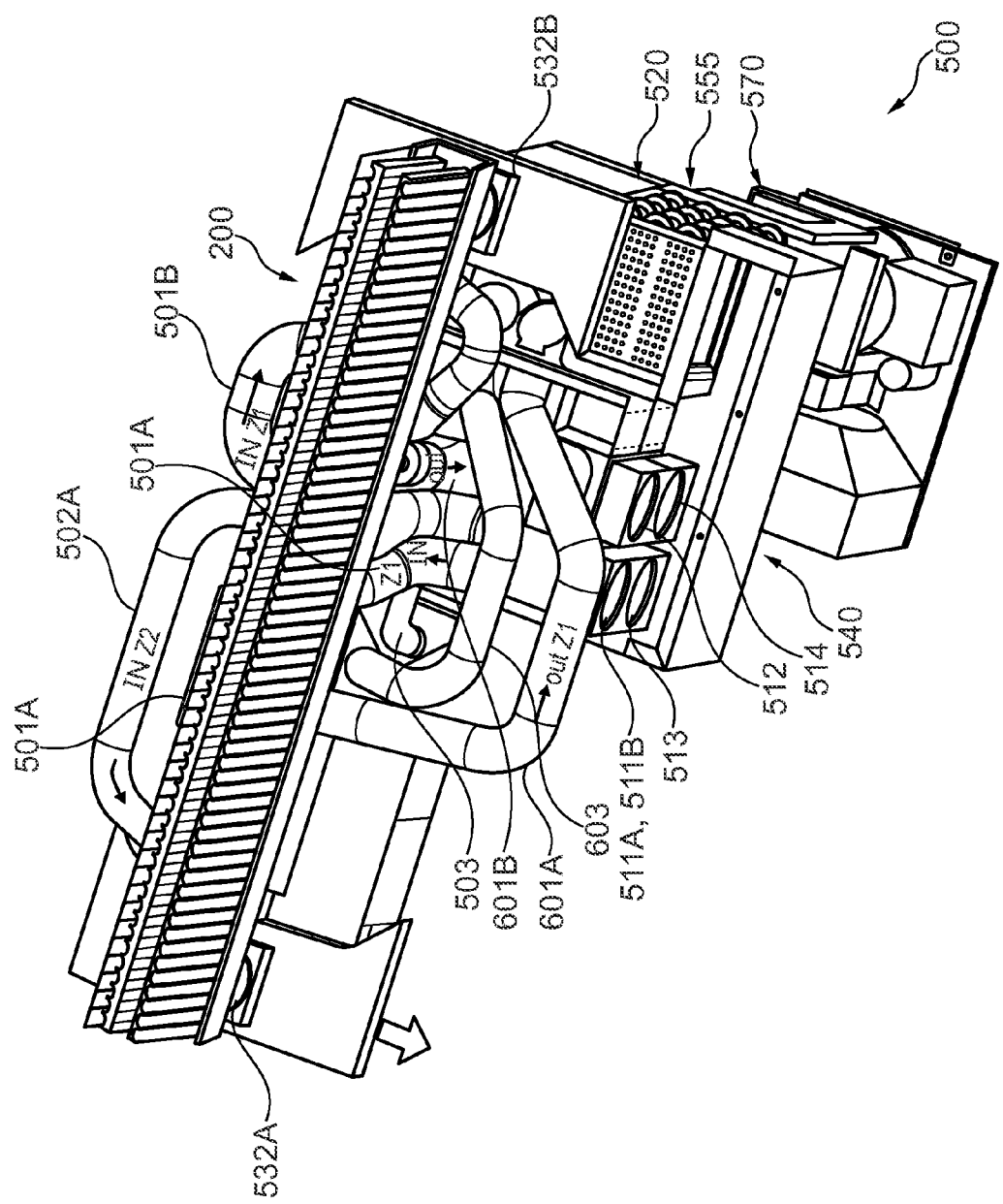

FIG. 6 corresponds to FIG. 5, but showing also the cooling arrangement 200, comprising the cooling tower, as further described with reference to FIG. 7, which shows an advantageous embodiment of a cooling arrangement (or element) 200 comprising a cooling medium conduit 201, on two outer longitudinal sides of which two first cooling plate elements 210A, 210B are disposed, which may be used in the cooling system as discussed above for cooling of the first climate zone Z1, for a dual sided food bar arrangement. The cooling medium conduit 201 is provided with two inlets 202, 202, connecting to, or comprising the zone conduits 501A, 501B through which a cooling medium is introduced, and on which the shunting fans are provided as discussed above with reference to FIGS. 3-6. The cooling medium then circulates in the branch conduit 201, which also is provided with two symmetrically located (return) outlets 203, 203, also arranged symmetrically with respect to the inlets, here at a slight distance from the inlets 202, 202, in a direction towards the center of longitudinal extension of the cooling medium conduit 201. The return outlets are connected to, or comprise, the first recirculation, or return, conduits 601A, 601B discussed above. There could also have been any other number of inlets and outlets, e.g. depending on the length of the cooling medium conduit, and on the functioning of the cooling system/arrangement as such. In order to enable the provisioning of an even temperature distribution, it is of significance that the inlets and outlets are disposed in a symmetric manner, e.g. with respect to the center of the cooling medium conduit, and with respect to one another.

The same amount of cooling medium is input on the first zone conduits 501A,501B to both, or each, inlet 202, 202 to allow for an even distribution of cooling medium in the cooling medium conduit, or alternatively the amount may be separately controllable in some embodiments.

The cooling medium in some embodiments is air, in other embodiments it may be a cooling liquid, e.g. comprising water or any appropriate cooling medium. The temperature of the cooling medium depends on the surrounding outer temperature, and on the temperature(s) that is/are desired in the food bar. In some implementations, in which the cooling medium is air, or an air mixture, the temperature is about −20° C. If the cooling medium is water based, the temperature could be about −3 or −4° C.

The first cooling plate elements 210A, 210B in a particular embodiment comprises a plurality of internal flanges or ribs 211A, 211B extending in parallel, and a plurality of external cooling flanges 212A,212B extending in parallel in a direction substantially orthogonal to the longitudinal extension of the cooling medium conduit 201. The external flanges 212A, 212B are preferably arranged at a larger distance from each other than are the internal flanges 211A, 211B. One reason for that is that the larger distances between the external flanges facilitate cleaning, which normally is not required for the internal flanges facing the cooling medium conduit 201. In an advantageous embodiment the distance between adjacent external flanges is between 12 and 18 mm, particularly about 15 mm (peak-to-peak), whereas the distance between adjacent internal flanges (peak-to-peak) may be between ca. 5 and 8 mm. It should be clear that these figures merely are given for exemplifying reasons; the distances may be larger as well as smaller; the same distances may be used for the external and the internal flanges etc. In some embodiments the external flanges are deeper, i.e. protrude a longer distance from its baseplate than the internal flanges do (in the opposite direction). One reason therefore is to not lose any cooling capacity due to the distance between the plate and the cooling medium conduit being too large. However they are preferably much closer spaced as referred to above. The external flanges, however, may be larger in order to further increase the effective area, which is a means to increase the transfer of cooling power from the cooling medium conduit to the food bar, or the products to be cooled.

A cooling medium, here air, is introduced to, and circulates in the cooling medium conduit 201. It particularly holds a temperature of about −20° C. Regularly spaced from one another, at a distance, e.g. 10-15 mm from the upper edge of the branch conduit 201, and all along its upper edge in a symmetric manner, a plurality of openings, e.g. circular holes 204 (see FIG. 9) with a diameter of about 4-5 mm, are disposed. It should be clear that the figures concerning diameter and distance etc. are merely given for exemplifying reasons. The distances between the openings, and their diameter may be larger as well as smaller. In the shown embodiment they are arranged symmetrically in one row. In alternative embodiments it might of course be two or more rows, the openings might also have another shape, of importance being that they are located in a symmetric manner along the upper edge of the cooling medium conduit 201. The cool air escaping through the openings 204 will flow downwards, along the outer side wall surfaces of the cooling medium conduit 201 (see FIG. 8), in the space formed between said outer surfaces and in "channels" formed by the internal flanges of the first cooling plate elements 210A, 210B which are disposed in parallel with the outer surfaces, at a small distance, or as close as possible.

Due to the provisioning of the internal flanges, i.e. the inner increased effective area, the cooling plate elements 210A, 210B will be more efficiently cooled by means of the cooling medium conduit, in other words the cooling transfer capacity will be enhanced. Further, due to the additional provisioning of the external flanges 212A, 212B, the effective area for cooling transfer on the outside is also increased. Thus, the transfer of cooling power from the cooling medium conduit 201 to the first cooling plate elements is increased due to the internal flanges 211A, 211B, and the transfer to outer sides of the cooling plate elements is likewise increased due to the enhanced effective area obtained by means of the external flanges.

In different embodiments the flanges (internal and/or external) may have the same size, shape and be arranged equidistantly throughout the entire area of a first cooling plate element, whereas in other embodiments it may be provided for an even more increased effective area e.g. along the outer side edges of the cooling plate elements where cooling losses may be larger due to a covering element being opened. This can be provided for in different manners, e.g. by means of larger flanges, e.g. with a larger height, or deeper, and/or arranged at a smaller distance from each other etc.

The cooling plate elements may, in alternative embodiments, comprise corrugated surfaces, or be provided with fins, or formed so as to exhibit a large effective area towards the cooling medium conduit in many different manners.

In advantageous embodiments as described above, it has been seen that the cooling transfer capacity may be increased from about 30% for state of the art arrangements up to about 70%.

Through the arrangement of a first cooling plate element on at least one side of the cooling medium conduit 201 discussed above, an excellent optimal cooling transfer capacity is enabled. When the products are covered by a covering arrangement, cooling will be efficient also due to self-convection. Thereby the need for using fans as a cooling means is reduced or eliminated, although circulation fans (541A,541B in FIG. 4) may be implemented as an auxiliary or additional cooling means, which is extremely advantageous.

In some embodiments the inner of the cooling medium conduit may be divided so as to comprise more than one flows of cooling medium, further contributing in reducing an uneven temperature distribution. By increasing the material thickness (e.g. metal) at desired locations in the cooling medium conduit, e.g. at the outer edges, or wherever needed, a buffering of cold can be achieved as an additional means.

In some embodiments, only the inner surface areas of the cooling element plates are enhanced by means of flanges, or alternatively only the outer surface areas.

The outer side of the cooling arrangement 200, also denoted the cooling tower, should, in some preferred embodiments, have a temperature in the range of −3° C. to +2° C.

The flanges, ribs or fins preferably extend in parallel from the upper edge of the respective first cooling plate element to the lower edge, perpendicularly to the edges, forming parallel channels or in one alternative embodiment, forming a slight angle of one or a few degrees with a central line extending from the upper to the lower edge of the cooling medium conduit, symmetrically with respect to the upper edge midpoint, outwards to the outer side edges of the first cooling plate elements.

The flanges or similar may also be slightly inclined or angled such that they are not quite symmetric, one side of a flange being somewhat more inclined, or shorter, than the other side.

The flanges are preferably rounded, and the valleys between them also. The cooling plate elements may e.g. be made of aluminium, but also other materials are possible, including any metal or metal alloy or an appropriate plastic material.

The first cooling plate elements 210A, 210B (and the outer side walls of the branch conduit 201) are in the shown embodiment arranged in a somewhat downwards, outwards slanting manner to give the air flowing on the outer sides an slight additional push, which is advantageous. The outer side walls of the branch conduit and the cooling plate elements may of course, alternatively, be entirely vertically disposed.

The air flowing downwards between the outer surface of the cooling medium conduit 201 and a respective first cooling plate element, i.e. in the channels formed by the internal flanges, for example flows back to the evaporator 555 (FIGS. 3-7), of the cooling system, and the air on the outside of the first cooling plate elements flows downwards, and out over the products kept in pans, such that air will flow due to self-convection if the products are located under a cover.

FIG. 8 shows a cooling arrangement 200' according to another embodiment in which additional, second, cooling plate elements 220A', 220B' are disposed in parallel with, outside, and at a slight distance from, respective first cooling plate elements 210A', 210B'. The distance is substantially given by the height of the external flanges or rims 212A', 212B'. In other respect the elements shown in FIG. 8 correspond to the elements shown in FIG. 7, and the corresponding reference numerals provided with a prime symbol are used. These elements will therefore not be further discussed here.

The second cooling plate elements 220A', 220B' are provided with two rows, a lower and an upper row, of gills or fins 221A', 222A' opening up in an upward direction. The gills may have any appropriate shape and size, and may alternatively be arranged in more than two rows, or in any appropriate manner such that at least some gills are disposed at another distance from the upper/lower edge of the cooling medium conduit 201' than other gills. They may also be somewhat inclined to the right or to the left in FIG. 8, such that the center of the openings form an angle less than 90° with a line along the side walls, i.e. the respective second element plate, perpendicular to the upper and lower edges thereof.

In the shown embodiment the gills or fins 221A', 222A' are fixed. In an alternative embodiment they are closable, i.e. they can be opened and closed respectively, manually or automatically. In still another embodiment their positions are controllable, hence it may be possible to regulate their opening angle β. In a particular embodiment some of the gills are closable or controllable, for example if some regions require more cooling, the gills above such regions can be opened up more and vice versa.

Figure 11:
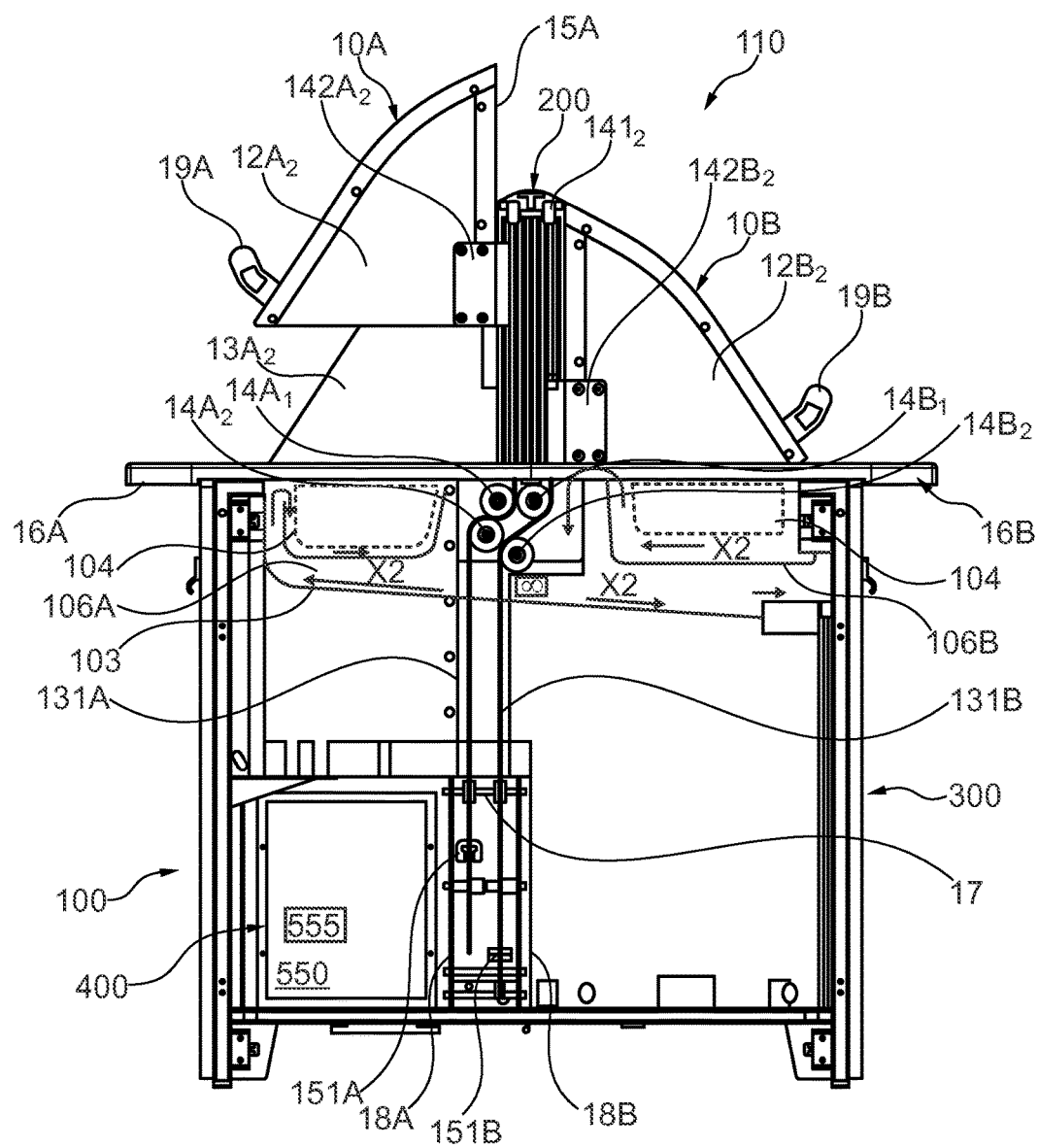
FIG. 11 is a side view of an embodiment as in FIG. 10.

The purpose of the second cooling plate elements 220A', 220B' is to further increase the self-convection over the pans, under covering elements, and air will enter the gills from the space above the holding arrangement with pans containing food products, and flow downwards, while being cooled when passing in the space, channels, between the inner sides of second cooling element plates 220A', 220B' and the external flanges 212A', 212B' of the first cooling plate elements 210A, 210B, providing an enlarged effective cooling area, which means that cooling transfer capacity will be most efficient. If used with a covering arrangement comprising covering elements which are moved between an open and a closed position through being vertically displaced up and down, e.g. as shown in FIGS. 1 and 11, and which furthermore have rear walls ending at a position at an appropriate distance from the lower edges of side and front walls of the covering elements, in a closed position of the covering elements, the lower rows of gills 222A' will be exposed all the time, i.e. not covered by the rear section, allowing the entry of air, which will be cooled as explained above. When a covering element is opened, it will be moved upwards in a vertical direction, and also the gills 221A' which are located in the upper row will be uncovered, allowing the entry of air which will be refrigerated as discussed above, and will flow out over the canteens or pans, hence assisting in further compensating, in addition to the larger effective area of the cooling plate being uncovered, for losses in cooling capacity when the covering elements are opened, in that the self-convection will be even more stimulated, and more air will be refrigerated.

A further advantage of using gills, is that radiation losses are reduced.

Thus, when more cooling in the first zone is needed, more cooling is automatically provided, hence demanding less increase, or sometimes even no increase, in cooling power capacity from the cooling system, e.g. via the shunting fans. In some embodiments, as referred to above, also auxiliary fans (541A,541B in FIG. 4) are provided above the space between the first cooling plate elements 210A', 210B' and second cooling plate elements 220A', 220B' for pushing in additional air.

In some embodiments such auxiliary circulation fans can be activated when there is a need for additional cooling power, or for example under more or less extreme conditions, such as a high surrounding temperature, or for products requiring a particularly low temperature. The auxiliary fans are then preferably also controlled by the control unit depending at least on sensed temperature in the zone Z1.

In a particular embodiment the outer walls of the cooling medium conduit are provided with a number of booster openings 224' with a diameter of about 2.5-3.5 mm, e.g. 3 mm, which however merely indicates an advantageous embodiment, see FIG. 9, located below the row of openings (see also openings 204), and corresponding openings 225', 226' in the first and second cooling plate elements, at a position which is located at the entry of a number of the upper gills 221A', 221B' to further enhance the cooling capacity. In one embodiment there are eight such booster openings 224' (225', 226') on each outer side wall. There may of course be more as well as fewer booster openings; they may be equidistantly disposed, or only in the regions of the outer side edges, or wherever an even more increased cooling capacity is needed.

FIG. 9 is a very schematic view in cross-section of a cooling arrangement 200' as shown in FIG. 8. On both sides of the cooling medium conduit 201' first cooling plate elements 210A', 210B' with internal and external flanges are provided. Cool air flows through openings 204', only very schematically indicated, along the outer side walls of the cooling medium conduit 201', whereas by means of the inner flanges the effective cooling area is enhanced, efficiently cooling the first cooling plate elements 210A', 210B', which via the external flanges provide a high cooling capacity in the channels formed on the outer sides. Air entering via the gill openings via self-convection, arrows C1, C2, is further cooled in the space or the channels formed by the external flanges, and flows out, arrows D, over pans, not shown, hence cooling the products therein. Arrows X indicate air flows returning to the evaporator of the cooling system. In FIG. 9 the booster openings 224' in the outer walls of the cooling medium conduit 201', and corresponding openings 225', 226' in the first and second cooling plate elements respectively, additionally assist in cooling down the air entering the upper gills 221A', 221B' as discussed with reference to FIG. 8.

In FIG. 9 the cross-section is taken through walls of the flanges and flows F1, F2 are schematically indicated although the actual flow channels between flanges cannot be seen.

The cooling arrangement shown herein may be used with a covering arrangement as disclosed in the Swedish patent application "A covering arrangement for a refrigerated food bar arrangement, and a food bar arrangement with such a covering arrangement" filed by the same applicant, from which priority is claimed, and the content of which herewith is incorporated herein by reference. Then the lower gills 222A', 222B' are uncovered, always allowing the entry of circulating air, whereas the upper gills are covered by a covering element when it is in a closed position, and uncovered when the covering element is opened, i.e. lifted up, hence also allowing circulating air to entry, possibly boosted in embodiments comprising booster openings 224'.

In FIG. 9 also the cooling of second climate zone Z2 is indicated. It is schematically illustrated how the pans 104 are disposed in holder elements 106A,106B provided in an appropriate manner in, or with respect to the holding arrangement 103 such that the shunting fans 532A,532B assist in forcing the air to flow as indicated by X2 in FIG. 9, representing the flow in the second zone Z2. The cooled air flows, cooled in the cooling system (the evaporator), and by means of the circulation fans 532A,532B out in the holding arrangement 103, under the holding elements 106A, 106B, up between the outer sides of the holder elements 106A,106B and the outer walls of the holding arrangement 103, in under the pans 104,104 in the holder elements, towards the inner, back sides of the pans, up between the pan back walls and the inner or back walls of the holder elements, thus circulating in a reverse flow. This is particularly advantageous, since it prevents a back suction of warm air, air which is warmed up in the second zone, the cold well or the trough, into another zone, e.g. in case of a problem in a zone, e.g. a malfunctioning valve or similar. Instead there may be a back suction of cooled air (cooled by the evaporator) into such other zone, which rather is an advantage.

There are two main risks associated with the production of a back suction. It might be produced by the circulation fans, creating a suction over the tray slides, which might result in warm air being sucked into the system, the zones. Back suction might also be produced by the shunting fans, sucking air from the bottom of the trough.

However, through the particular arranging of the flow direction in the second zone etc. according to the invention, these problems are avoided.

Figure 10:
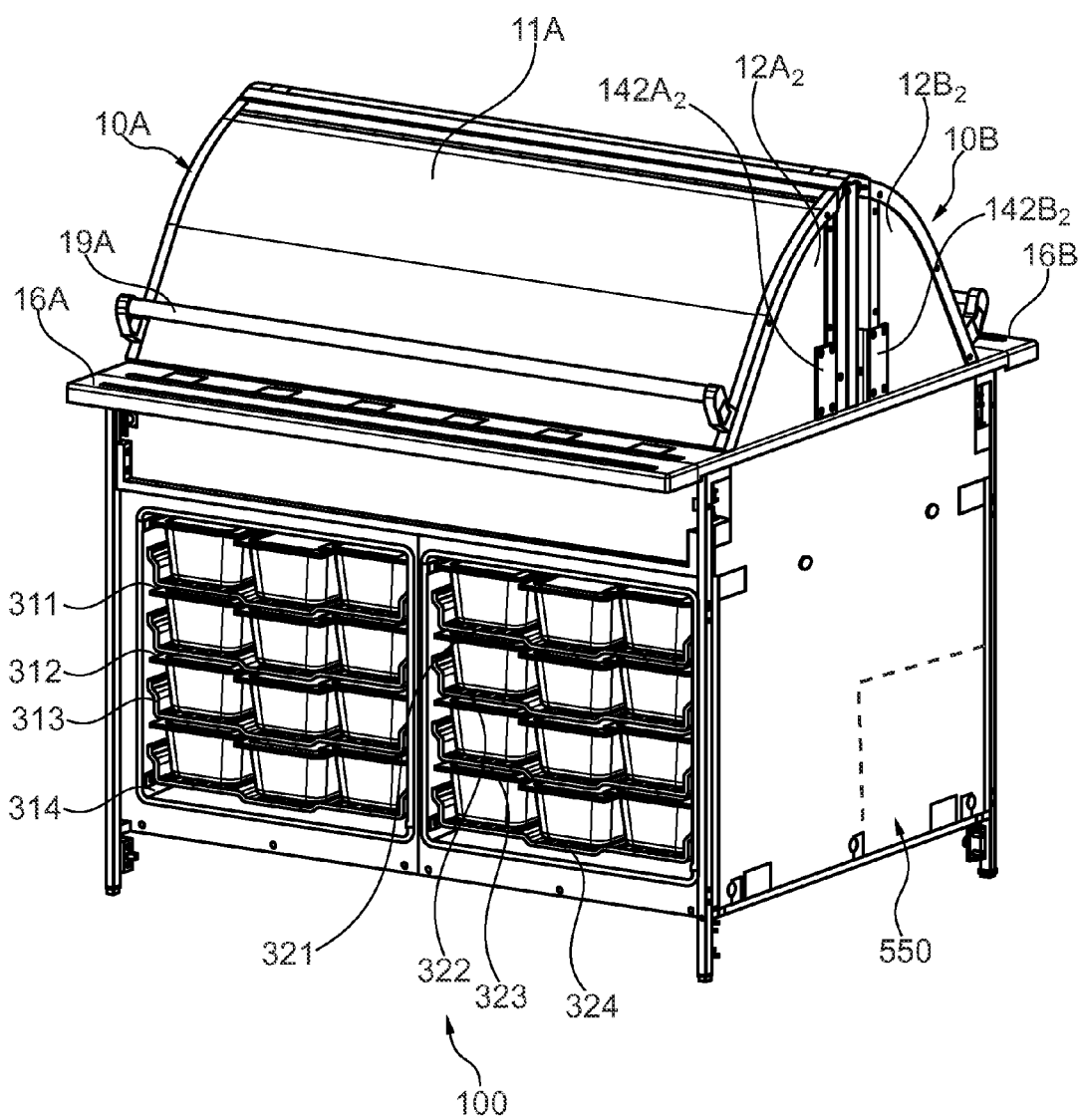
FIG. 10 is a schematic illustration of a covering arrangement of a food bar arrangement also illustrating a third climate zone comprising a refrigerator according to a particular embodiment.

FIG. 10 schematically illustrates a food bar arrangement 100 with the third zone Z3, here comprising refrigerators (front doors removed for reasons of clarity) with a plurality of shelves 311,312,313,314 and 321,322,323,324 arranged in two sections, disposed side by side, with the cover elements in closed positions, also illustrating the tray slides 16A,16B. In an advantageous implementation two refrigerators are placed back-to-back instead. Each shelf here comprises two outer sections and an intermediate section, which is displaced in height with respect to the respective outer sections in order to provide space for as many pans as possible. It should be clear that this merely relates to one particular embodiment; there may be any number of shelves, they may have any shape and size. Through an arrangement of the shelves as in FIG. 10, it is however possible to maximize the number of canteens or pans held therein. The cabinet might be divided into a refrigerator and a thawing zone Z4, only refrigerators, there being no fourth zone, or only thawing spaces. In an advantageous embodiment, a forth zone comprising a thawing space is provided above the refrigerating arrangement 550. The functioning of the covering arrangement is explained with reference to FIG. 11, explaining some of the reference numerals not discussed with reference to FIG. 11, but shown in the Figure.

FIG. 11 is a very schematic cross-sectional side view of a food bar arrangement 100 with a covering arrangement 110 used in the particular embodiment and with removed outer cabinet side wall. The machine room 400 is only very schematically illustrated and, as referred to above, comprises an evaporator 555, a compressor, a condenser etc. of a cooling system also comprising the cooling arrangement 200.

The second side sections $13A_1$ (not shown in this Fig.), $13A_2$ may according to different embodiments be fixedly, or detachably, connected to, either the mounting structure $141_1$ (not shown), $141_2$ or the respective mounting elements, or alternatively fixedly or detachably connected to the food bar holding arrangement 103. They may alternatively be connected to the covering elements 10A,10B, e.g. to inner sides of the first side sections $12A_2,12B_2$ of the covering elements in a sliding manner, e.g. via cooperating grooves and nuts or by means providing a similar functionality, and securable by means of appropriate fastening means to the food bar arrangement 100, for example to the holding arrangement 103.

The mounting structure 141 of the covering arrangement 110 comprises a first mounting element $141_1$, here called a driving mounting element, and a second mounting element $141_2$ (not shown) disposed at an opposite outer side of the covering arrangement. The first mounting element $141_1$ here comprises a vertically disposed dual guide rail system with one guide rail for each covering element 10A,10B; the guide rails hence being arranged on opposite sides of a rail support, and being arranged to take up each a slide $142A_2$, $142B_2$ or carriage connected to a rear frame section $121A_2$, $121B_2$ and arranged for sliding up and down in the respective guide rail during opening and closing operations respectively. At the upper end of the mounting structure 141 a shaft (not shown) is transversally disposed such that at an outer end thereof, a dual wheel guide or trolley is provided, facing the rear side section or sections of the respective covering elements, (not shown) around which respective wires 131A, 131B run via guide rollers $14A_1,14A_2,14B_1,14B_2$ and over a roller 17, and which, at the opposite ends, are connected to a respective spring 151A,151B, see FIG. 3, arranged in a bracket arrangement 18A,18B.

The springs 151A,151B are arranged to be pivotally connected, each separately, over a pivot point to allow the opening and the closing movement of the covering elements to be eccentrically driven, hence allowing a soft closure after being brought over the pivot point, and an automatic opening at crossing the pivot point in the opposite direction. As an alternative to a dual wheel guide or trolley there may be two separate upper trolleys or guiding elements, one for each covering element.

FIG. 11 also very schematically illustrates an exemplary arrangement of the pans, and the separately controlled flow of cooling medium as discussed above in the second zone comprising the cold well(s) or the trough, with holder elements in which pans (in an advantageous embodiment one-way pans, or alternatively conventional pans for refilling and reuse) are disposed.

FIG. 12 schematically illustrates an assembly 700 comprising two food bar arrangements 100 according to the invention, each with two, three or four different and separately controllable climate zones, and each preferably comprising one single evaporator.

Of course an assembly may as well comprise more or fewer food bar arrangements; the food bar arrangements may be dual sided or not, and comprise two or more different climate zones. In the shown implementation the food bar assembly also includes a service station 710 for accessories, bowels or packages for food products, cutlery, towels, ketchup, mustard, dressings, spices etc.

It should be clear that the invention is not limited to the specifically illustrated embodiments, but that it can be varied in a number of ways within the scope of the appended claims.

Particularly it is of course not limited to any particular number of pans, sizes and shapes of pans or holding elements or covering arrangements.

The pan holder elements, and/or separate pan support elements, may be so arranged that the pans will be disposed in an inclined manner, e.g. with an inclination angle α having a value between 5.5° and 9.5°, or preferably between 6.5° and 8.5°, or any appropriate smaller or a larger value.

Bottom planes of the holding arrangement may in some alternative embodiments be inclined in opposite directions towards one another, forming an angle $+/-\beta$ respectively with a fictive horizontal plane connecting their outer edges. Alternatively a holding arrangement with a flat bottom is used. In other embodiments a separate holding arrangement may be used for each side of a dual sided food bar.

The food bar arrangement may be adapted for taking up one row of pans (canteens), it may be square shaped to take up four rows of pans, with a cooling arrangement in the center of pair wise oppositely arranged pan back walls, or it may even comprise a circular or oval cooling arrangement with pans disposed to surround it, the pans, particularly pan back walls, having correspondingly adapted shapes and sizes. Any number of food bar arrangements with cabinet arrangements may be arranged in any appropriate manner and combination

The invention claimed is:

1. A food bar, comprising:
   a holding arrangement configured to receive a plurality of pans for holding food, the holding arrangement including a cabinet and being configured with at least one cold well, the food bar being adapted to hold the plurality pans such that food in the pans is accessible via pan openings to a user at least from a first outer side section of the food bar;
   a cooling system comprising a refrigerator for cooling the food bar in at least two separate climate zones and a cooling arrangement in communication with the refrigerator, the cooling arrangement being arranged with respect to the holding arrangement such that the cooling arrangement is located close to and above a location where back walls of the pans are located when the pans are received in the holding arrangement and adjacent to a rear section of an openable covering arrangement that covers the received pans in a closed position;
   the cooling arrangement being arranged such that cooled air flows in a first cooling flow from a lower edge of the cooling arrangement outward above the received pans, and upward in toward an upper edge of the cooling arrangement due to self-convection, thereby forming a first climate zone;
   the holding arrangement comprises a bottom section disposed at a distance from pan holder elements disposed in the holding arrangement such that the at least one cold well is provided below and on lateral sides of the received pans and forms a second climate zone;
   the cooling system is adapted to separately control cooling of the second climate zone by a separately controlled second cooling flow, and the cooling system comprises a main cooling chamber and a recirculation chamber;
   the refrigerator having a compressor, a condenser, and an evaporator, the evaporator being arranged such that air flows through the recirculation chamber to the evaporator and then the main cooling chamber; and
   the main cooling chamber comprises at least one zone outlet for each climate zone, the zone outlets comprising separate zone conduits connected to each respective climate zone, and for each climate zone the cooling system includes at least one separately controllable shunting fan connected to respective zone conduits and configured to separately control cooling of the climate zones by controllable injection of a cooling medium into the climate zones.

2. The food bar of claim 1, wherein each zone conduit comprises a non-return valve disposed after the respective shunting fan for preventing back-flow from the respective climate zone to the main cooling chamber.

3. The food bar of claim 1, wherein the recirculation chamber is disposed on an input side of the evaporator, and a recirculation conduit is provided at least between the first climate zone and the recirculation chamber for returning air from the first climate zone to the recirculation chamber.

4. The food bar of claim 3, wherein the cooling system further comprises a compensation inlet for injection of external air, thereby compensating for leakage of circulating cooled air from the second climate zone.

5. The food bar of claim 1, wherein the cooling system cools the food bar in a third climate zone.

6. The food bar of claim 5, wherein the cooling system comprises a plurality of refrigerators for the plurality of climate zones.

7. The food bar of claim 5, further comprising a third climate zone conduit with a refrigerator shunting fan and a non-return valve that enables separate control of cooling the third climate zone, and a third-zone recirculation conduit is provided between the third climate zone and the recirculation chamber.

8. The food bar of claim 5, wherein the cooling system cools the food bar in a fourth climate zone, and the cooling system comprises at least one refrigerator for the fourth climate zone that has a temperature-controllable heating element and that is disposed below the holding arrangement.

9. The food bar of claim 8, further comprising a fourth climate zone conduit with a shunting fan and a non-return valve that enables separate control of cooling the fourth climate zone, and a fourth-zone recirculation conduit is provided between the fourth climate zone and the recirculation chamber.

10. The food bar of claim 1, further comprising a control system adapted to control cooling of the climate zones, each climate zone having at least one zone temperature sensor for sensing temperature in the respective climate zone and each zone temperature sensor being in communication with the control system; wherein the control system controls cooling by shunting cooled air by the shunting fans.

11. The food bar of claim 10, wherein the control system controls speeds of the shunting fans.

12. The food bar of claim 1, wherein the cooling system includes one, two, or three shunting fans for the first climate zone that are connected to the first climate zone by two symmetrically disposed zone inlet conduits connected to outputs from the shunting fans; and inlets of the shunting fans are connected to the main cooling chamber via the first zone conduit.

13. The food bar of claim 1, wherein the covering arrangement comprises at least one covering element movable between a closed position, in which the received pans are covered and air is enabled to circulate above the pans, and an open position, in which the received pans are accessible; the covering arrangement further comprising a motion or position detector that is adapted to register a position or a movement of the at least one covering element; wherein the at least one shunting fan is controlled based on a signal from the motion or position detector.

14. The food bar of claim 13, wherein the cooling arrangement comprises a cooling element, and the at least one covering element comprises the rear section disposed on one side of the cooling element, such that a larger area of the cooling element on the side facing the covering element in the open position is revealed and a smaller area is revealed when the covering element is in the closed position.

15. The food bar of claim 12, wherein for the first climate zone, two symmetrically disposed climate zone inlet conduits are provided, and two symmetrically disposed recirculation outlet conduits are provided for communication with the recirculation chamber.

16. The food bar of claim 1, further comprising at least one auxiliary fan blower arranged above the cooling system for blowing air downward either on outer sides of the cooling system or between first and second cooling plate elements of the cooling system, wherein the at least one auxiliary fan is controlled based on a temperature in the first climate zone.

17. The food bar of claim 7, wherein the cooling system comprises one or two zone circulation fans for the second climate zone, and the one or two zone circulation fans and the shunting fan for the second climate zone are controllable based on a temperature in the second climate zone.

18. The food bar of claim 16, wherein the covering arrangement comprises at least one covering element movable between a closed position, in which the received pans are covered and air is enabled to circulate above the pans, and an open position, in which the received pans are accessible; the covering arrangement further comprising a motion or position detector that is adapted to register a position or a movement of the at least one covering element; wherein the at least one shunting fan and the at least one auxiliary fan is controlled based on a signal from the motion or position detector.

19. The food bar of claim 6, wherein the cooling system for the third climate zone comprises at least one zone-specific circulation fan whose speed is controllable based on a temperature in the third climate zone.

20. The food bar of claim 19, further comprising a motion or position detector that is adapted to register a position or a movement of a door in the third climate zone; wherein the at least one zone-specific circulation fan is controlled based on a signal from the motion or position detector.

21. The food bar of claim 8, wherein the cooling system comprises at least one zone-specific circulation fan for the fourth climate zone, and the at least one zone-specific circulation fan for the fourth climate zone is controllable based on a temperature in the fourth climate zone.

22. The food bar of claim 1, wherein the cooling system further comprises at least one circulation fan for the second climate zone arranged to circulate a second flow of cooled air outward toward an inner side of an outer lateral wall of the holding arrangement, upward between the outer lateral wall and an outer wall of a pan holder, downward and inward between outer and bottom sections of the received pans and a bottom and outer section of the pan holder, and upward between an inner pan holder element wall and a pan back wall, above an upper pan holder edge and downward passing the evaporator, and then out between the bottom of the pan holder and the bottom of the holding arrangement, thereby providing a reversed flow that prevents back suction of air warmed in the second climate zone into another climate zone.

23. The food bar of claim 10, wherein the control system separately controls the shunting fans of the separate climate zones based on respective temperatures in the climate zones.

24. The food bar of claim 1, wherein the cooling system comprises one evaporator for the at least two separate climate zones.

25. The food bar of claim 1, wherein the holding arrangement is so disposed that two parallel rows of pans are received in respective pan holders longitudinally along either side of the cooling arrangement.

26. The food bar of claim 13, wherein the at least one covering element has a front section, the rear section, and two first side sections disposed between and interconnecting the front and rear sections along opposite outer edges thereof; the rear section extends in a substantially vertical plane in a mounted state of the covering arrangement on the food bar; the covering arrangement comprises a mounting structure with at least first and second mounting elements extending in a substantially vertical direction in the mounted state; the at least one covering element is movable in a vertical direction between a lower closed position and an upper open position; and the covering arrangement further cooperates with two second side sections connected to the food bar such that when the at least one covering element is in the closed position, the first side sections are disposed adjacent to and substantially in parallel with the second side sections, and that when the at least one covering element is in the open position, the second side sections form side walls.

27. The food bar of claim 3, wherein the cooling arrangement further comprises a cooling medium conduit with a number of cooling medium inputs forming the input zone conduits of the first climate zone and with a number of cooling medium outputs that form the recirculation conduit for the first climate zone and that are disposed symmetrically along the cooling medium conduit; the cooling medium conduit has at least one side wall, comprising a plurality of openings disposed along an upper edge thereof through which cool air exits; the cooling medium conduit has an outer wall that is adjacent and in parallel with at least a first cooling plate element, the first cooling plate element comprising internal flanges on an inner side facing the cooling medium conduit and/or external flanges on an outer side.

* * * * *